US010425826B2

(12) United States Patent
Fakoorian et al.

(10) Patent No.: US 10,425,826 B2
(45) Date of Patent: Sep. 24, 2019

(54) AUTONOMOUS UPLINK (UL)/DOWNLINK (DL) TRANSMISSION IN NEW RADIO-SPECTRUM SHARING (NR-SS)

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Taesang Yoo, Riverside, CA (US); Aleksandar Damnjanovic, Del Mar, CA (US); Juan Montojo, San Diego, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 15/612,588

(22) Filed: Jun. 2, 2017

(65) Prior Publication Data
US 2018/0176787 A1 Jun. 21, 2018

Related U.S. Application Data

(60) Provisional application No. 62/437,531, filed on Dec. 21, 2016.

(51) Int. Cl.
H04W 16/14 (2009.01)
H04W 28/02 (2009.01)
(Continued)

(52) U.S. Cl.
CPC ....... H04W 16/14 (2013.01); H04W 28/0289 (2013.01); H04W 40/24 (2013.01);
(Continued)

(58) Field of Classification Search
None
See application file for complete search history.

(56) References Cited

U.S. PATENT DOCUMENTS

| 8,498,227 B2 | 7/2013 | Nentwig et al. |
| 2006/0009229 A1* | 1/2006 | Yuan ............ H04W 72/14 455/452.1 |

(Continued)

FOREIGN PATENT DOCUMENTS

WO    WO-2016146767 A1    9/2016

OTHER PUBLICATIONS

Cisco Systems: "Uplink Channel Access for LAA", 3GPP Draft; R1-153844, 3rd Generation Partnership Project (3GPP), Mobile Competence Centre; 650, Route Des Lucioles; F-06921 Sophia-Anti Polls Cedex; France, vol. Ran WG1, No. Beijing, China; Aug. 23, 2015, XP051039349, Retrieved from the Internet: URL:http://www.3gpp.org/ftp/Meetings_3GPP_SYNC/RAN1/Docs/ [retrieved on Aug. 23, 2015], 6 pages.

(Continued)

Primary Examiner — Alex Skripnikov
(74) Attorney, Agent, or Firm — Haynes and Boone, LLP

(57) ABSTRACT

Wireless communications systems and methods related to autonomous uplink transmission and autonomous downlink transmission in a shared spectrum are provided. A first wireless communication device identifies a transmission opportunity (TXOP) in a shared spectrum shared by a plurality of network operating entities. The first wireless communication device is associated with a first network operating entity of the plurality of network operating entities. The first wireless communication device a first frequency band of the shared spectrum designated for autonomous communication by the first network operating entity during the TXOP. The first wireless communication device communicates, with a second wireless communication (Continued)

device associated with the first network operating entity in the first frequency band, autonomous data during the TXOP.

22 Claims, 14 Drawing Sheets

(51) Int. Cl.
    *H04W 56/00*     (2009.01)
    *H04W 40/24*     (2009.01)
    *H04W 88/06*     (2009.01)
    *H04W 74/08*     (2009.01)
    *H04W 72/04*     (2009.01)

(52) U.S. Cl.
    CPC ... *H04W 56/0015* (2013.01); *H04W 72/0453* (2013.01); *H04W 74/0816* (2013.01); *H04W 88/06* (2013.01)

(56) References Cited

U.S. PATENT DOCUMENTS

| | | | | |
|---|---|---|---|---|
| 2015/0139091 A1* | 5/2015 | Azizi | ............ | H04L 5/0035 370/329 |
| 2016/0164652 A1 | 6/2016 | Huang et al. | | |
| 2016/0338078 A1 | 11/2016 | Wang et al. | | |
| 2017/0180088 A1* | 6/2017 | Adachi | ............ | H04W 48/10 |

OTHER PUBLICATIONS

Ericsson: "On Autonomous UL Transmissions for NR in Unlicensed Spectrum", 3GPP Draft; R1-1612779, 3rd Generation Partnership Project (3GPP), Mobile Competence Centre; 650, Route Des Lucioles; F-06921 Sophia-Anti Polis Cedex; France, vol. Ran WG1, No. Reno, USA; Nov. 13, 2016, XP051176721, Retrieved from the Internet: URL:http://www.3gpp.org/ftp/Meetings_3GPP_SYNC/RAN1/Docs/ [retrieved on Nov. 13, 2016], 3 pages.

International Search Report and Written Opinion—PCT/US2017/059127—ISA/EPO—dated Feb. 2, 2018.

3GPP TR 38.912 V1.0, 3rd Generation Partnership Project; Technical Specification Group Radio Access Network; Study on New Radio (NR) Access Technology, (Release 14), Mar. 2017, pp. 1-74.

Ericsson: "On Autonomous UL Transmissions for NR in Unlicensed Spectrum", 3GPP TSG RAN WG1 AH_NR Meeting, R1-1701135, Spokane, US, Jan. 16-20, 2017, pp. 1-3.

LG Electronics: "Support for V2V Services Based on LTE Sidelink", 3GPP TSG-RAN WG2 Meeting #95, R2-165839, Gothenburg, Sweden, Aug. 22-26, 2016, pp. 1-20.

\* cited by examiner

AUTONOMOUS UPLINK (UL)/DOWNLINK (DL) TRANSMISSION IN NEW RADIO-SPECTRUM SHARING (NR-SS)

CROSS REFERENCE TO RELATED APPLICATIONS

The present application claims priority to and the benefit of the U.S. Provisional Patent Application No. 62/437,531, filed Dec. 21, 2016, which is hereby incorporated by reference in its entirety.

TECHNICAL FIELD

This application relates to wireless communication systems, and more particularly to transmitting autonomous data in a shared frequency spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations (BSs), each simultaneously supporting communication for multiple communication devices, which may be otherwise known as user equipment (UE).

A wireless communications system may operate over a shared spectrum, meaning that the wireless communications system includes one or more frequency bands that may be shared by multiple network operating entities. The shared spectrum may include unlicensed spectrum and/or licensed spectrum. In some instances, multiple network operating entities may share their licensed spectrum with each other to better utilize the spectrum. In some other instances, multiple network operating entities may obtain a licensed spectrum together.

Use of the available band spectrum may then be subject to a contention procedure that may involve the use of a medium-sensing procedure. For example, to avoid interference between different devices or between devices operated by different network operating entities, the wireless communications system may employ medium-sensing procedures, such as listen-before-talk (LBT), to ensure a particular channel is clear before transmitting a message. Medium-sensing procedures may utilize substantial signaling overhead and may result in increased latency, thus adversely affecting the use of shared spectrum by multiple network operating entities.

One approach to reducing medium-sensing signaling overheads is to employ a priority-based coordinated access scheme for spectrum sharing. In a priority-based coordinated access scheme, a shared spectrum is partitioned into multiple time periods. Each time period is designated for a particular type of access. For example, a time period can be allocated to a particular network operator for exclusive access of the shared spectrum, where no reservation from the particular network operator is required. Alternatively, a time period can be shared among multiple network operators on a priority basis with reservations. For example, a high priority network operator may have priority or guaranteed access of the shared spectrum in a time period, but requires a prior reservation of the time period. When the high priority network operator does not reserve the time period, a low priority network operator can opportunistically access the shared spectrum in the time period.

While the priority-based coordinated access scheme allows multiple operators to operate over a shared spectrum, the time-division multiplexing (TDM) nature of the priority-based coordinated access scheme may not meet the latency requirement of time-critical traffic or ultra-reliability low latency communication (URLLC) traffic. Accordingly, improved procedures for transmitting time-critical data or URLLC over a shared spectrum are desirable.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes identifying, by a first wireless communication device associated with a first network operating entity of a plurality of network operating entities, a transmission opportunity (TXOP) in a shared spectrum shared by the plurality of network operating entities; identifying, by the first wireless communication device, a first frequency band of the shared spectrum designated for autonomous communication by the first network operating entity during the TXOP; and communicating, by the first wireless communication device with a second wireless communication device associated with the first network operating entity in the first frequency band, autonomous data during the TXOP.

In an additional aspect of the disclosure, an apparatus includes a processor configured to: identify a transmission opportunity (TXOP) in a shared spectrum shared by a plurality of network operating entities, wherein the apparatus is associated with a first network operating entity of the plurality of network operating entities; and identify a first frequency band of the shared spectrum designated for autonomous communication by the first network operating entity during the TXOP; and a transceiver configured to communicate, with a first wireless communication device associated with the first network operating entity in the first frequency band, autonomous data during the TXOP.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
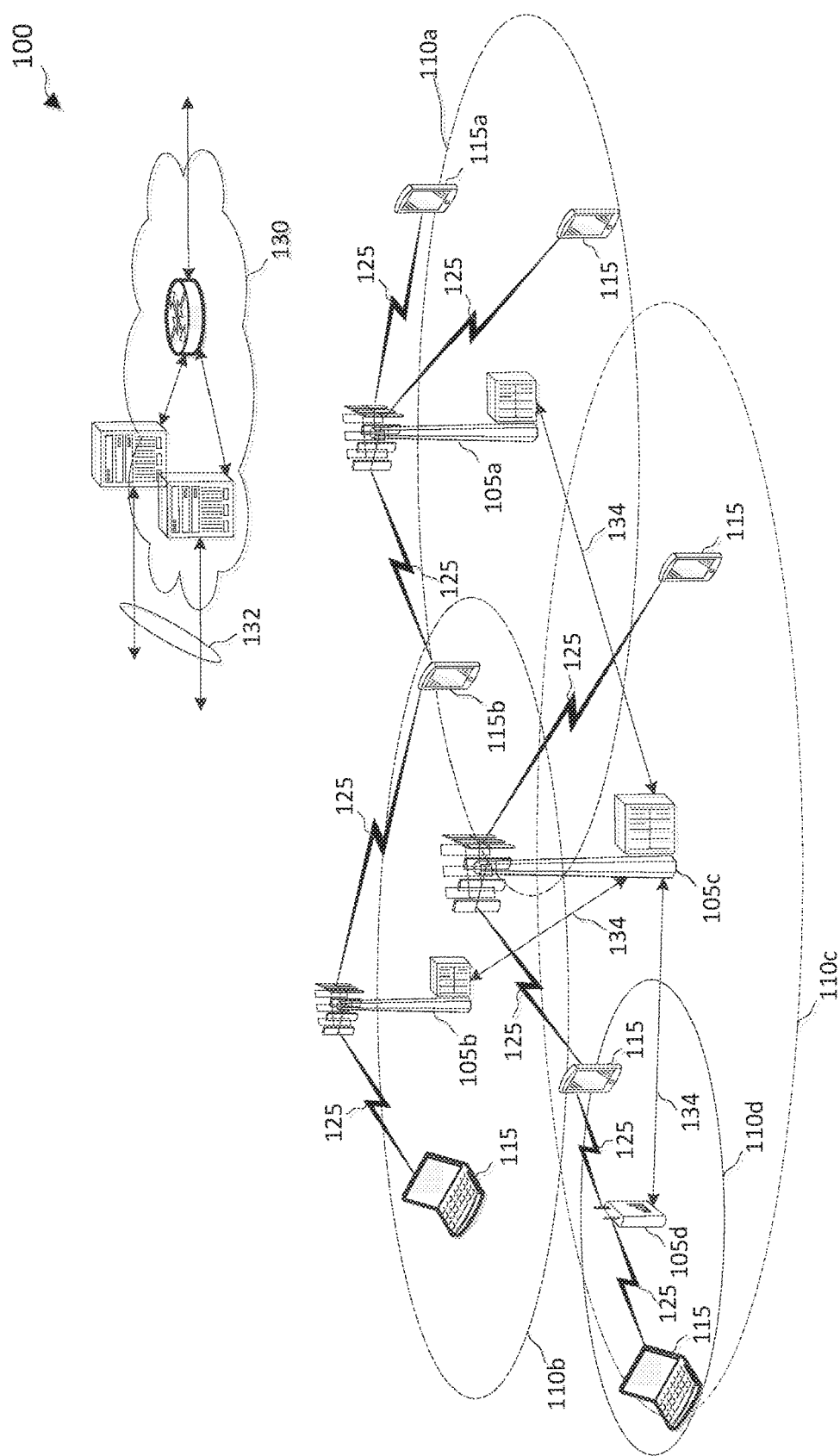
FIG. 1 illustrates a wireless communication network according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as code-division multiple access (CDMA), time-division multiple access (TDMA), frequency-division multiple access (FDMA), orthogonal frequency-division multiple access (OFDMA), single-carrier FDMA (SC-FDMA) and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., $5^{th}$ Generation (5G) operating in mmWav bands) network.

The present disclosure describes autonomous UL and DL transmission mechanisms in a shared spectrum shared by multiple network operating entities. In a priority-based spectrum sharing scheme, a shared spectrum is time-partitioned into transmission opportunities (TXOPs). Each TXOP is designated for prioritized use by a prioritized or (e.g., high priority) network operating entity and opportunistic use by low priority network operating entities based on reservations. The disclosed embodiments allocate a fraction of frequency resources (e.g., a frequency band in the shared spectrum) in each TXOP for each network operating entity to transmit autonomous data. For example, each TXOP may include a shared frequency band and a plurality of dedicated frequency bands in the shared spectrum. The shared frequency band may be used for regular communication based on reservations. Each dedicated frequency band is designated for autonomous communication by a particular network operating entity. Regular communication refers to UL and/or DL transmissions that are based on a schedule provided by a BS. The schedule may be referred to as a regular schedule. Autonomous communication refers to UL and/or DL transmissions that are independent of the schedule. In one embodiment, a dedicated frequency band may be pre-configured with a UL-DL split ratio for UL and DL autonomous communications. In some embodiments, dynamic TDD may be applied to a dedicated frequency band to switch a link priority, for example, from UL to DL or from DL to UL.

The present disclosure may provide several benefits. For example, the frequency-division multiplexing (FDM) of autonomous and regular communications and the allocation of a dedicated frequency band in each TXOP for each operator may reduce transmission latency for ultra-reliability low latency communication (URLLC) traffic. In addition, the dynamic TDD allows an operator to dynamically switch a link priority may improve bandwidth utilization and further improves transmission latency for URLLC traffic. The disclosed embodiments are suitable for use in coverage areas including macro cells and small cells. The disclosed embodiments are compatible with any wireless communication protocol.

FIG. 1 illustrates a wireless communication network 100 according to embodiments of the present disclosure. The network 100 includes BSs 105, UEs 115, and a core network 130. In some embodiments, the network 100 operates over a shared spectrum. The shared spectrum may be unlicensed or partially licensed to one or more network operators. Access to the spectrum may be limited and may be controlled by a separate coordination entity. In some embodiments, the network 100 may be a LTE or LTE-A network. In yet other embodiments, the network 100 may be a millimeter wave (mmW) network, a new radio (NR) network, a 5G network, or any other successor network to LTE. The network 100 may be operated by more than one network operator. Wireless resources may be partitioned and arbitrated among the different network operators for coordinated communication between the network operators over the network 100.

The BSs 105 may wirelessly communicate with the UEs 115 via one or more BS antennas. Each BS 105 may provide communication coverage for a respective geographic coverage area 110. In 3GPP, the term "cell" can refer to this particular geographic coverage area of a BS and/or a BS subsystem serving the coverage area, depending on the context in which the term is used. In this regard, a BS 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell may generally cover a relatively smaller geographic area and may allow unrestricted access by UEs with service subscriptions with the network provider. A femto cell may also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a pico cell may be referred to as a pico BS. A BS for a femto cell may be referred to as a femto BS or a home BS. In the example shown in FIG. 1, the BSs 105a, 105b and 105c are examples of macro BSs for the coverage areas 110a, 110b and 110c, respectively. The BSs 105d is an example of a pico BS or a femto BS for the coverage area 110d. As will be recognized, a BS 105 may support one or multiple (e.g., two, three, four, and the like) cells.

Communication links 125 shown in the network 100 may include uplink (UL) transmissions from a UE 115 to a BS 105, or downlink (DL) transmissions, from a BS 105 to a UE 115. The UEs 115 may be dispersed throughout the network 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

The BSs 105 may communicate with the core network 130 and with one another. The core network 130 may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the BSs 105 may communicate, either directly or indirectly (e.g., through core network 130), with each other over backhaul links 134 (e.g., X1, X2, etc.), which may be wired or wireless communication links.

Each BS 105 may also communicate with a number of UEs 115 through a number of other BSs 105, where the BS 105 may be an example of a smart radio head. In alternative configurations, various functions of each BS 105 may be distributed across various BSs 105 (e.g., radio heads and access network controllers) or consolidated into a single BS 105.

In some implementations, the network 100 utilizes orthogonal frequency division multiplexing (OFDM) on the downlink and single-carrier frequency division multiplexing (SC-1-DM) on the UL. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. The system bandwidth may also be partitioned into sub-bands.

In an embodiment, the BSs 105 can assign or schedule transmission resources (e.g., in the form of time-frequency resource blocks) for DL and UL transmissions in the network 100. The communication can be in the form of radio frames. A radio frame may be divided into a plurality of subframes, for example, about 10. Each subframe can be divided into slots, for example, about 2. In a frequency-division duplexing (FDD) mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are pre-determined signals that facilitate the communications between the BSs 105 and the UEs 115. For example, a reference signal can have a particular pilot pattern or structure, where pilot tones may span across an operational bandwidth or frequency band, each positioned at a pre-defined time and a pre-defined frequency. For example, a BS 105 may transmit cell-specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than UL communication.

In an embodiment, a UE 115 attempting to access the network 100 may perform an initial cell search by detecting a primary synchronization signal (PSS) from a BS 105. The PSS may enable synchronization of period timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring.

In some embodiments, the UEs 115 and the BSs 105 may be operated by multiple network operators or network operating entities and may operate in a shared radio frequency spectrum, which may include licensed or unlicensed frequency bands. The shared spectrum may be time-partitioned for sharing among the multiple network operating entities to facilitate coordinated communication. For example, in the network 100, the BS 105a and the UE 115a may be associated with one network operating entity, while the BS 105b and the UE 115b may be associated with another network operating entity. By time-partitioning the shared spectrum according to network operating entities, the communications between the BS 105a and the UE 115a and the communications between the BS 105b and the UE 115b may each occur during respective time periods and may avail themselves of an entirety of a designated shared spectrum. In addition, certain time periods may be allocated for certain types of communication or access over the shared spectrum. Further, certain frequency bands in the shared spectrum may be allocated for autonomous transmissions to meet latency requirements of time-critical data such as URLLC traffic, as described in greater detail herein.

To support coordinated access of the shared spectrum, a BS 105 or an entity of the core network 130 may act as a central arbitrator to manage access and coordinate the partitioning of resources among different network operating entities operating within the network 100. In some embodiments, the central arbitrator may include a spectrum access system (SAS). In addition, the transmissions from the multiple network operating entities can be time synchronized to facilitate the coordination.

Figure 2:
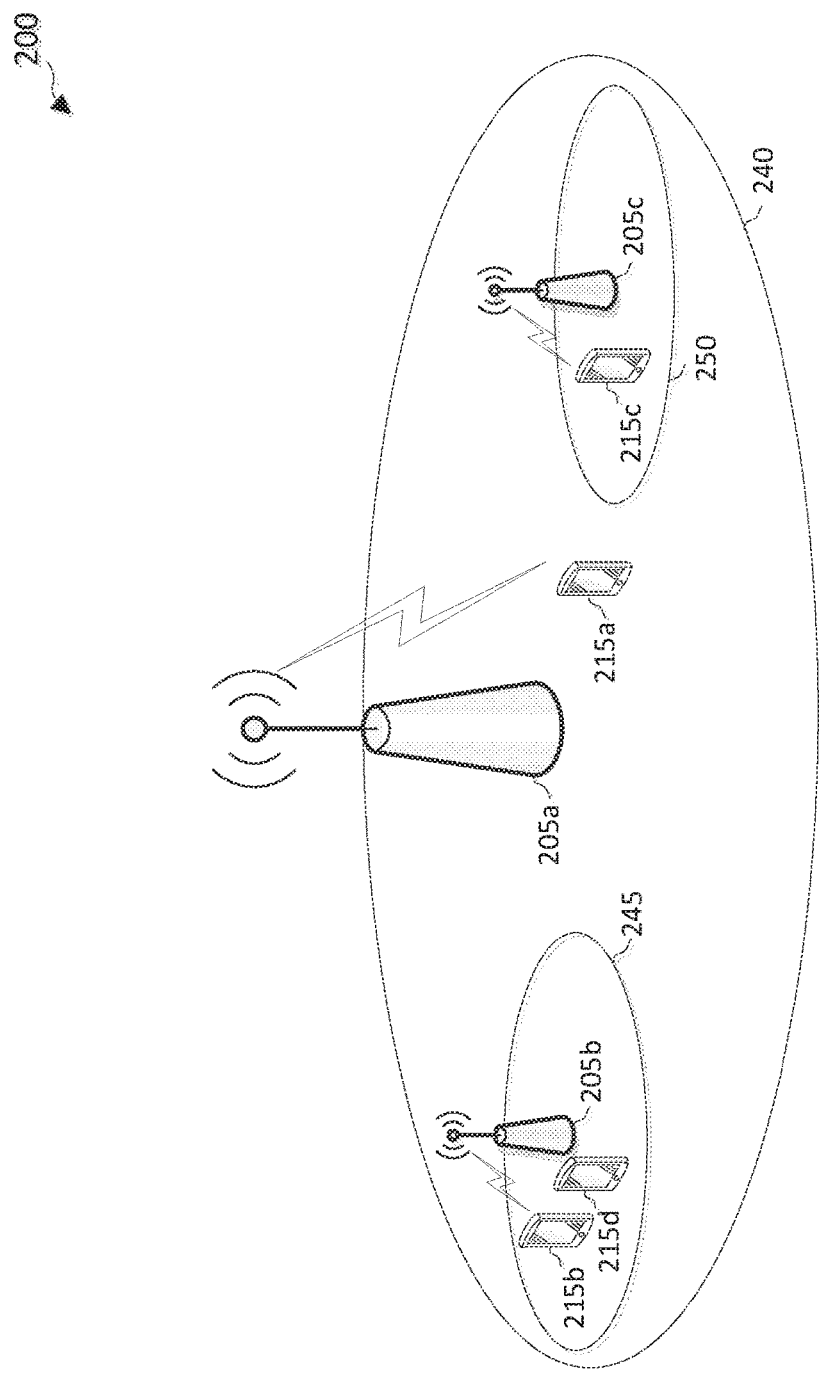
FIG. 2 illustrates an example of a wireless communications network that supports priority-based spectrum sharing according to embodiments of the present disclosure.

FIG. 2 illustrates an example of a wireless communications network 200 that supports priority-based spectrum sharing according to embodiments of the present disclosure. The network 200 may be similar to the network 100. FIG. 2 illustrates three BSs 205 and four UEs 215 for purposes of simplicity of discussion, though it will be recognized that embodiments of the present disclosure may scale to many more UEs 215 and/or BSs 205. The BSs 205 and the UEs 215 may be similar to the BSs 105 and the UEs 115, respectively. The BS 205a serves the UE 215a in a macro cell 240. The BS 205b serves the UEs 215b and 215d in a pico cell 245 within a coverage area of the macro cell 240. The BSs 205c serves the UE 215c in another pico cell 250 within the coverage area of the macro cell 240. The BSs 205 and the UEs 215 may communicate over the same spectrum.

Due to the different transmission power requirements or power-classes of nodes (e.g., the BSs 205 and the UEs 215) in the macro cell 240 and the pico cells 245 and 250, different power-class nodes may be treated as different network operating entities and assigned with different priorities for sharing the spectrum to minimize interference. For example, the BS 205a and the UE 215a may be treated as one network operating entity (e.g., Operator A), the BS 205b and 205c and the UEs 215b-d may be treated as another network operating entity (e.g., Operator B). In the present disclosure, the terms network operating entity and operator may be used interchangeably and may be associated with a particular priority and/or a particular power class.

The spectrum may be partitioned by classifying time resources into periods and assigning the periods to different network operating entities. In some embodiments, certain time periods may be allocated for exclusive use by a particular network operating entity. Other time periods may be allocated for prioritized use or guaranteed use by a particular network operating entity, but may also be for opportunistic use by the other network operating entities. In yet other examples, certain time periods may be designated for opportunistic use by all network operating entities, for example, to enable additions of network operating entities into the network 200 in a non-centralized manner. The claiming of the time periods for prioritized use or opportunistic use may be based on reservations, as described in greater detail herein.

Figure 3:
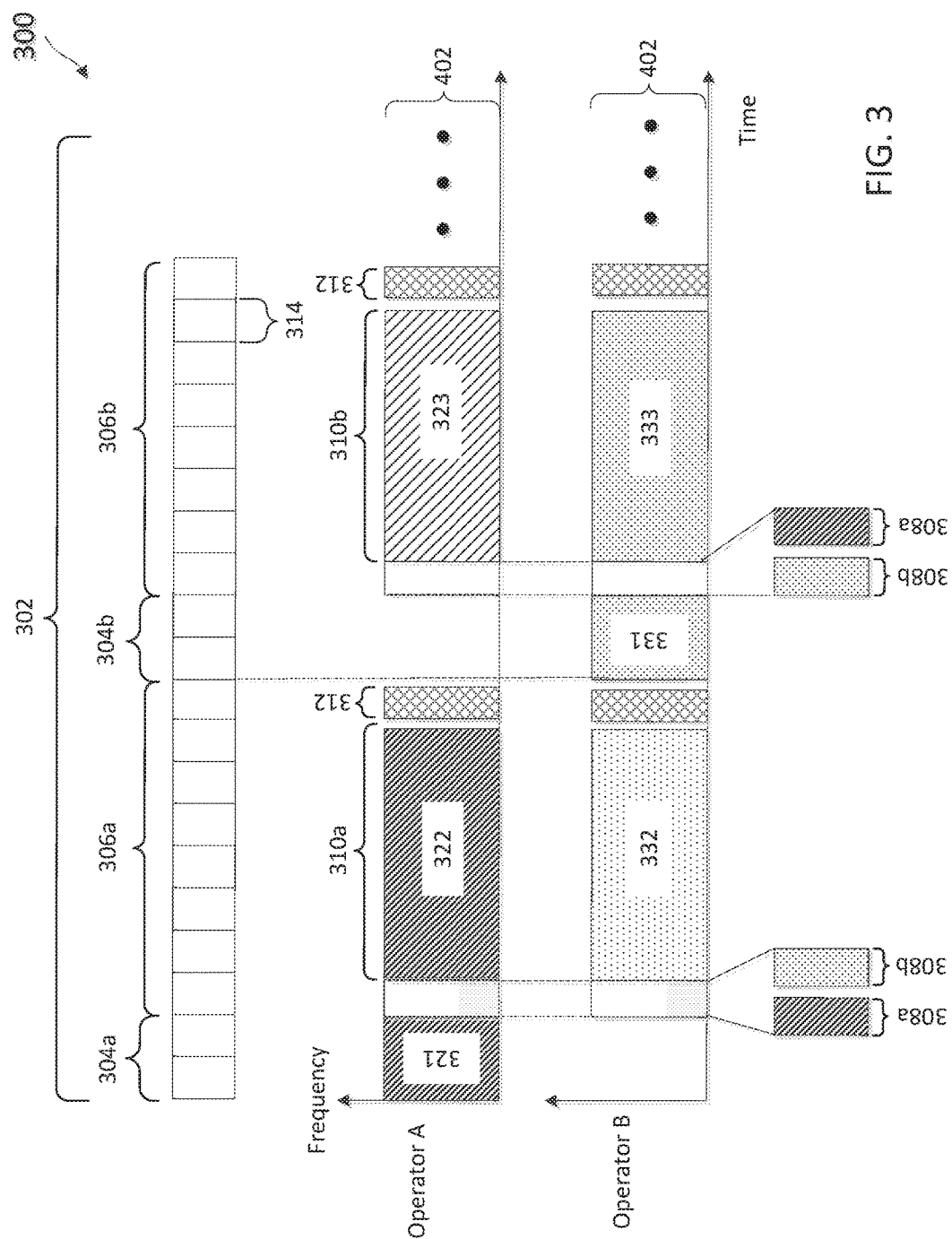
FIG. 3 illustrates a priority-based spectrum sharing scheme according to embodiments of the present disclosure.

FIG. 3 illustrates a priority-based spectrum sharing scheme 300 according to embodiments of the present disclosure. The x-axis represents time in some constant units. The y-axis represents frequency in some constant units. The scheme 300 may be employed by the BSs 105 and 205 and the UEs 115 and 215. While the scheme 300 illustrates coordinated spectrum access for two different network operating entities (e.g., Operator A and Operator B), the scheme 300 can be applied to any suitable number of network operating entities.

In the scheme 300, a shared spectrum over a frequency band 402 is time-partitioned into superframes 302. Each superframe 302 is partitioned into exclusive access periods 304 and TXOPs 306. Each TXOP 306 includes a plurality of channel sensing or clear channel assessment (CCA) periods 308 at the beginning of the TXOP 306, followed by a transmission period 310. The exclusive access periods 304, the CCA periods 308, and the transmission period 310 may have fixed durations. For example, each exclusive access period 304 may include one or more subframes, each CCA period 308 may include one or more OFDM symbols, and each transmission period 10 may include one or more subframes. In some embodiments, a superframe 302 may correspond to one radio frame (e.g., about 10 milliseconds (ms) long) and the TXOPs 306 may be defined in units of slots 314 (e.g., about 250 microseconds (μs) long). The structure of the superframe 302 is pre-determined and known by all network operating entities sharing the shared spectrum. The network operating entities may be time-synchronized when operating in the shared spectrum.

Each exclusive access period 304 is designated for exclusive use by a particular network operating entity. For example, the exclusive access period 304a is designated for exclusive communication 321 by Operator A. Operator B is not allowed to transmit during the exclusive access period 304a. Similarly, the exclusive access period 304b is designated for exclusive communication 331 by Operator B and Operator A is not allowed to transmit during the exclusive access period 304b. In an embodiment, the exclusive access period 304 can be used for acquisition and signaling of PSS, SSS, PBCH, SIB, and/or paging. In some other embodiments, an exclusive access period 304 may divided into multiple regions, each designated for exclusive use by a particular network operating entity, for example, via time-division multiplexing (TDM) or frequency-division multiplexing (FDM).

Each CCA period 308 in a TXOP 306 is assigned to a particular network operating entity. For example, the CCA periods 308a and 308b are assigned to Operators A and B, respectively. The number of CCA periods 308 in a TXOP 306 may be dependent on the number of network operating entities in a network. For example, a network with N network operators may include up to N CCA periods 308 in a TXOP 306. The CCA periods 308 can be arranged in a TXOP 306 based on communication or access priorities of the network operating entities, for example, in a descending order. Thus, each TXOP 306 is prioritized for use by a highest priority network operating entity, and may be utilized by lower priority network operating entities on an opportunistic basis if the prioritized network operating entity does not utilize the resources. In addition, the priorities of the network operating entities may rotate (e.g., in a round-robin fashion) among the TXOPs 306 within a superframe 302.

As shown, the TXOP 306a is designated for prioritized communication 322 by Operator A and opportunistic communications 332 by Operator B. The TXOP 306b is designated for prioritized communication 333 by Operator B and opportunistic communications 323 by Operator A. Prioritized communication refers to the use of guaranteed resources, whereas opportunistic communication refers to opportunistic use of resources not reserved by high priority operator.

As an example, an Operator A node (e.g., the BS 205a) may transmit a reservation in the CCA period 308a of the TXOP 306a to reserve the following transmission period 310a and communicate with another Operator A node (e.g., the UE 215a) in the transmission period 310a. Operator B nodes (e.g., the BS 205b and the UE 215b) may listen to the channel during the CCA period 308a. Upon detection of a reservation from the Operator A node, the Operator B nodes may refrain from using the transmission period 310a. However, when no reservation is detected in the CCA period 308a, an Operator B node (e.g., the BS 205b) may opportunistically use the transmission period 310a by transmitting a reservation in the CCA period 308b of the TXOP 310a and communicate with another Operator B node (e.g., the UE 215b) in the transmission period 310a. The reservation may be a pre-determined preamble sequence or a request-to-send (RTS) signal. In some embodiments, the target receiving node may respond to the RTS signal by sending a clear-to-send (CTS) signal. In some embodiments, the reservation may include a schedule (e.g., a DL trigger and/or a UL grant) for the transmission period 310a. The schedule may be referred to as a regular schedule. The communication in the transmission period 310 may be referred to as regular communication.

In some embodiments, each TXOP 306 may further include an autonomous period 312, for example, about one OFDM symbol long. The autonomous period 312 can be used for autonomous transmissions of time-critical or mission-critical data (e.g., URLLC data). Autonomous transmissions refer to transmissions without being scheduled by the regular schedule. While the scheme 300 provision for autonomous transmissions, the autonomous transmissions are time-division multiplexed with other traffic. Thus, the scheme 300 may not provide good support for link budget limited UEs (e.g., the UEs 115 and 215). For example, the shorter the time span, the higher the link budget is required. The longer the time span, the higher the overhead is incurred. In addition, TDM may not meet the latency requirement of time-critical data since transmission of time-critical data may be required to wait for an assigned prioritized access TXOP or wait for higher priority nodes to vacate in an opportunistic access TXOP.

Figure 4:
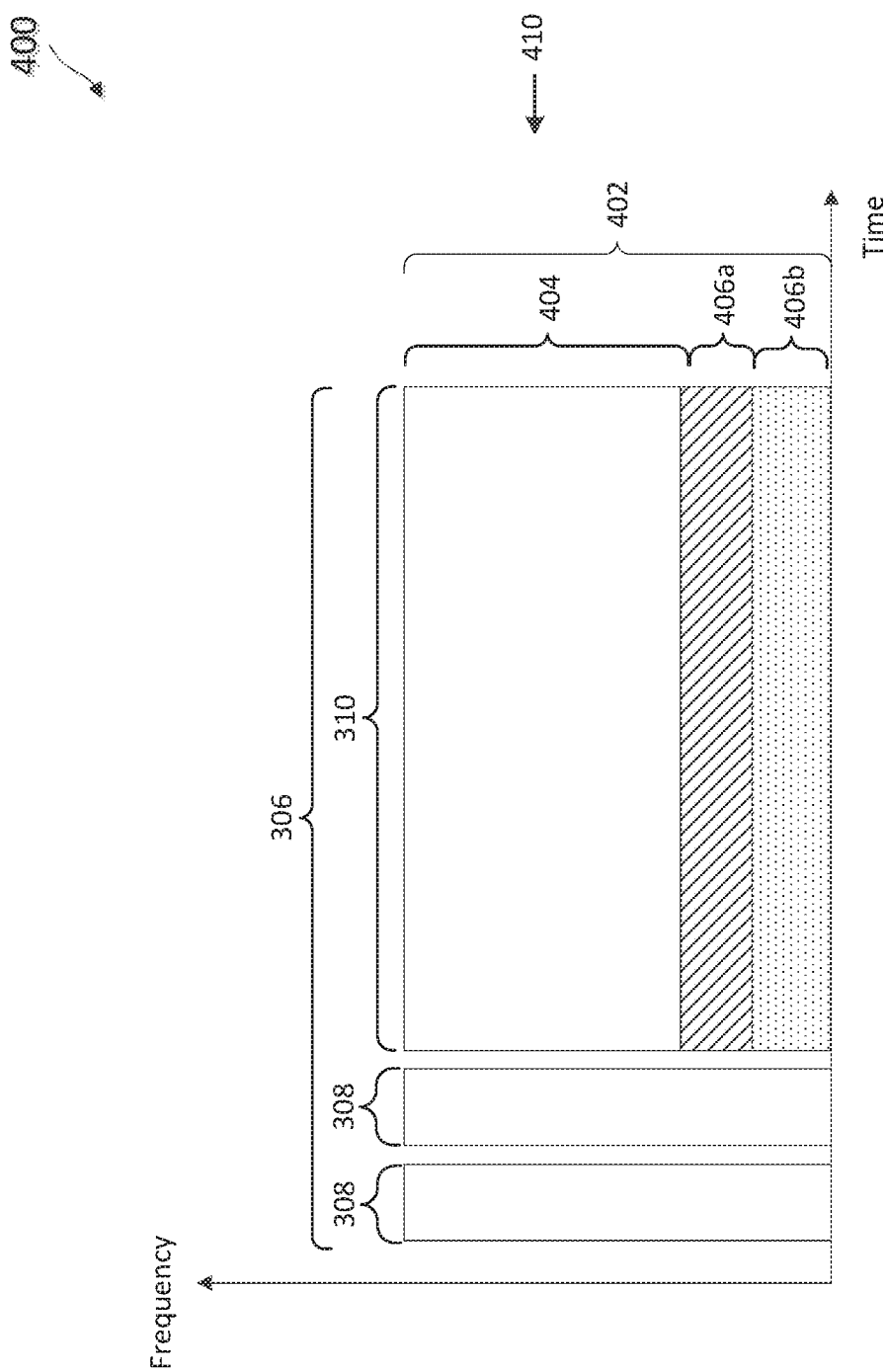
FIG. 4 illustrates a priority-based spectrum sharing scheme that supports frequency-division multiplexed autonomous data transmissions according to embodiments of the present disclosure.

FIG. 4 illustrates a priority-based spectrum sharing scheme 400 that supports frequency-division multiplexed autonomous data transmissions according to embodiments of the present disclosure. The x-axis represents time in some constant units. The y-axis represents frequency in some constant units. The scheme 400 may be employed by the BSs 105 and 205 and the UEs 115 and 215. The scheme 400 allocates a portion (e.g., about 2 percent (%)) of frequency resources in each TXOP for each operator to transmit autonomous data or URLLC data.

For example, the frequency band 402 is divided into a shared frequency band 404 and a plurality of dedicated frequency bands 406 as shown by the TXOP frame structure 410. The dedicated frequency bands 406 may be separated by guard bands (not shown) to mitigate adjacent band interference. The shared frequency band 404 may be shared by multiple network operating entities for regular communications based on priorities and reservations as described in the scheme 300. For example, Operator A may have prioritized access for regular communication over the shared frequency band 404 in the TXOP 306, while Operator B may have opportunistic access for regular communication over the shared frequency band 404 in the TXOP 306.

Each dedicated frequency band 406 may be designated for autonomous data transmissions by a particular network operating entity. For example, the frequency band 406a may be designated for Operator A to communicate autonomous data, while the frequency band 406b may be designated for another operator (e.g., Operator B) to communicate autonomous data. As shown, the CCA periods 308 span the entire frequency band 402. Thus, the autonomous communications can occur during the transmission period 310, and not during the CCA periods 308. In an embodiment, frequency hopping may be applied to the dedicated frequency bands 406 and may be dependent on the accessing operator of the TXOP 306. For example, in another TXOP 306, where Operator B has prioritized access and Operator A has opportunistic access, the positions of the dedicated frequency bands 406a and 406b may be swapped. The designations of the dedicated frequency bands 406 may be semi-statically configured based on a pre-determined frequency-hopping pattern. The autonomous data transmission mechanisms are described in greater detail herein.

While the scheme 400 is illustrated with two frequency bands 406, the scheme 400 may allocate N number of frequency bands 406 in each TXOP 306 to allow for autonomous communications by N number of operators, where N is a positive integer. By employing FDM instead of TDM for autonomous data transmissions, the scheme 400 allows for simultaneous autonomous and regular communications. Thus, the scheme 400 may improve autonomous transmission latency and provide better support for URLLC services when compared to the scheme 300.

Figure 5:
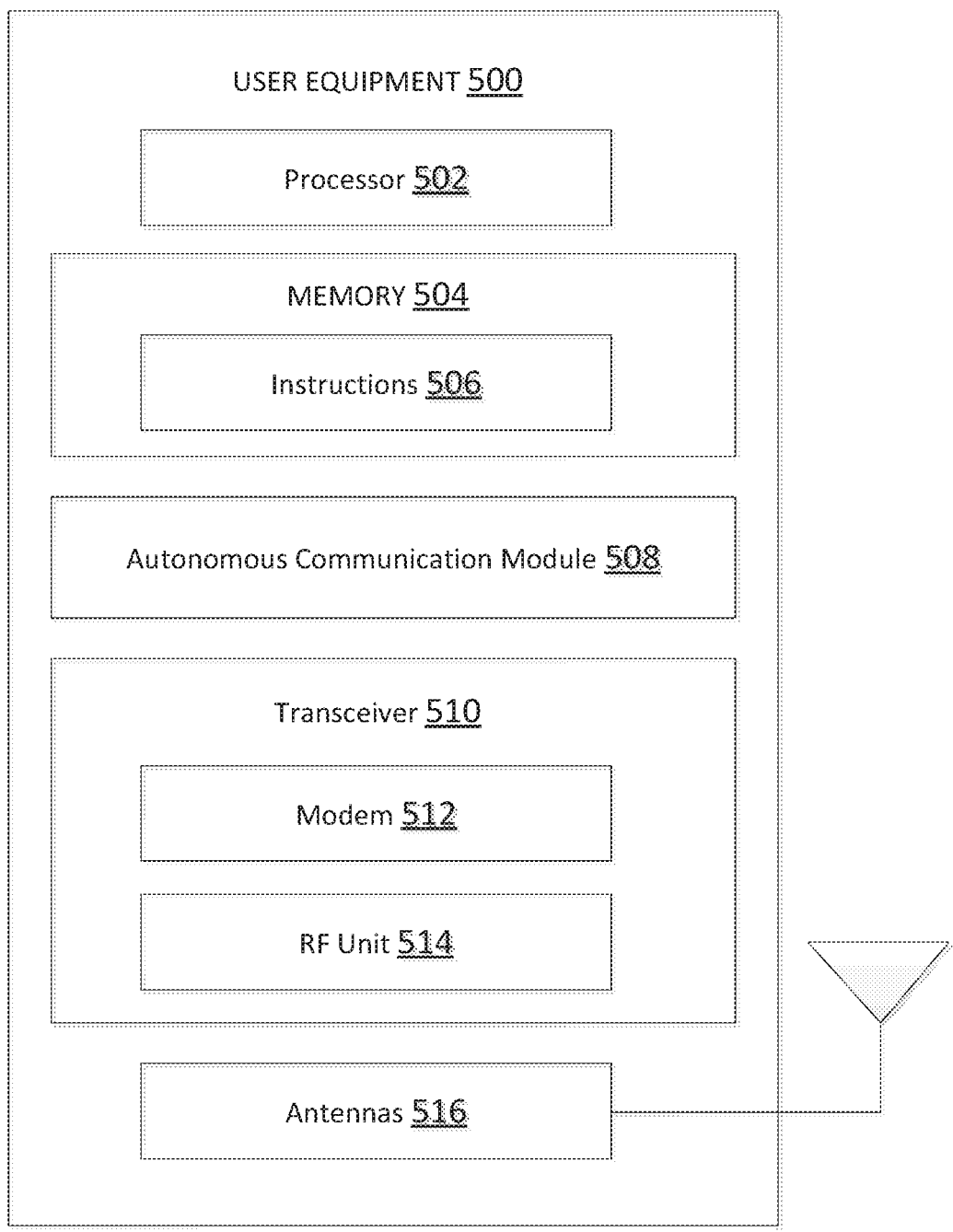
FIG. 5 is a block diagram of an exemplary user equipment (UE) according to embodiments of the present disclosure.

FIG. 5 is a block diagram of an exemplary UE 500 according to embodiments of the present disclosure. The UE 500 may be a UE 115 or 215 as discussed above. As shown, the UE 500 may include a processor 502, a memory 504, an autonomous communication module 508, a transceiver 510 including a modem subsystem 512 and a radio frequency (RF) unit 514, and an antenna 516. These elements may be in direct or indirect communication with each other, for example via one or more buses.

The processor 502 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 504 includes a non-transitory computer-readable medium. The memory 504 may store instructions 506. The instructions 506 may include instructions that, when executed by the processor 502, cause the processor 502 to perform the operations described herein with reference to the UEs 215 in connection with embodiments of the present disclosure. Instructions 506 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The autonomous communication module 508 may be used for various aspects of the present disclosure. For example, the autonomous communication module 508 is configured to identify TXOPs in a shared spectrum, identify autonomous transmission frequency bands in the TXOPs, perform network listening, reserve time periods for regular communication and/or autonomous communication over the shared spectrum, as described in greater detail herein.

As shown, the transceiver 510 may include the modem subsystem 512 and the RF unit 514. The transceiver 510 can be configured to communicate bi-directionally with other devices, such as the BSs 105 and 205. The modem subsystem 512 may be configured to modulate and/or encode the data from the memory 504 and/or the autonomous communication module 508 according to a modulation and coding scheme (MCS), e.g., a low-density parity check (LDPC) coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data from the modem subsystem 512 (on outbound transmissions) or of transmissions originating from another source such as a UE 215 or a BS 205. The RF unit 514 may be further configured to perform analog beamforming in conjunction with the digital beamforming. Although shown as integrated together in transceiver 510, the modem subsystem 512 and the RF unit 514 may be separate devices that are coupled together at the UE 215 to enable the UE 215 to communicate with other devices.

The RF unit 514 may provide the modulated and/or processed data, e.g. data packets (or, more generally, data messages that may contain one or more data packets and other information), to the antenna 516 for transmission to one or more other devices. This may include, for example, transmission of clear-to-send (CTS) signals according to embodiments of the present disclosure. The antenna 516 may further receive data messages transmitted from other devices. This may include, for example, reception of request-to-send (RTS) and/or CTS signals according to embodiments of the present disclosure. The antenna 516 may provide the received data messages for processing and/or demodulation at the transceiver 510. Although FIG. 5 illustrates antenna 516 as a single antenna, antenna 516 may include multiple antennas of similar or different designs in order to sustain multiple transmission links. The RF unit 514 may configure the antenna 516.

Figure 6:
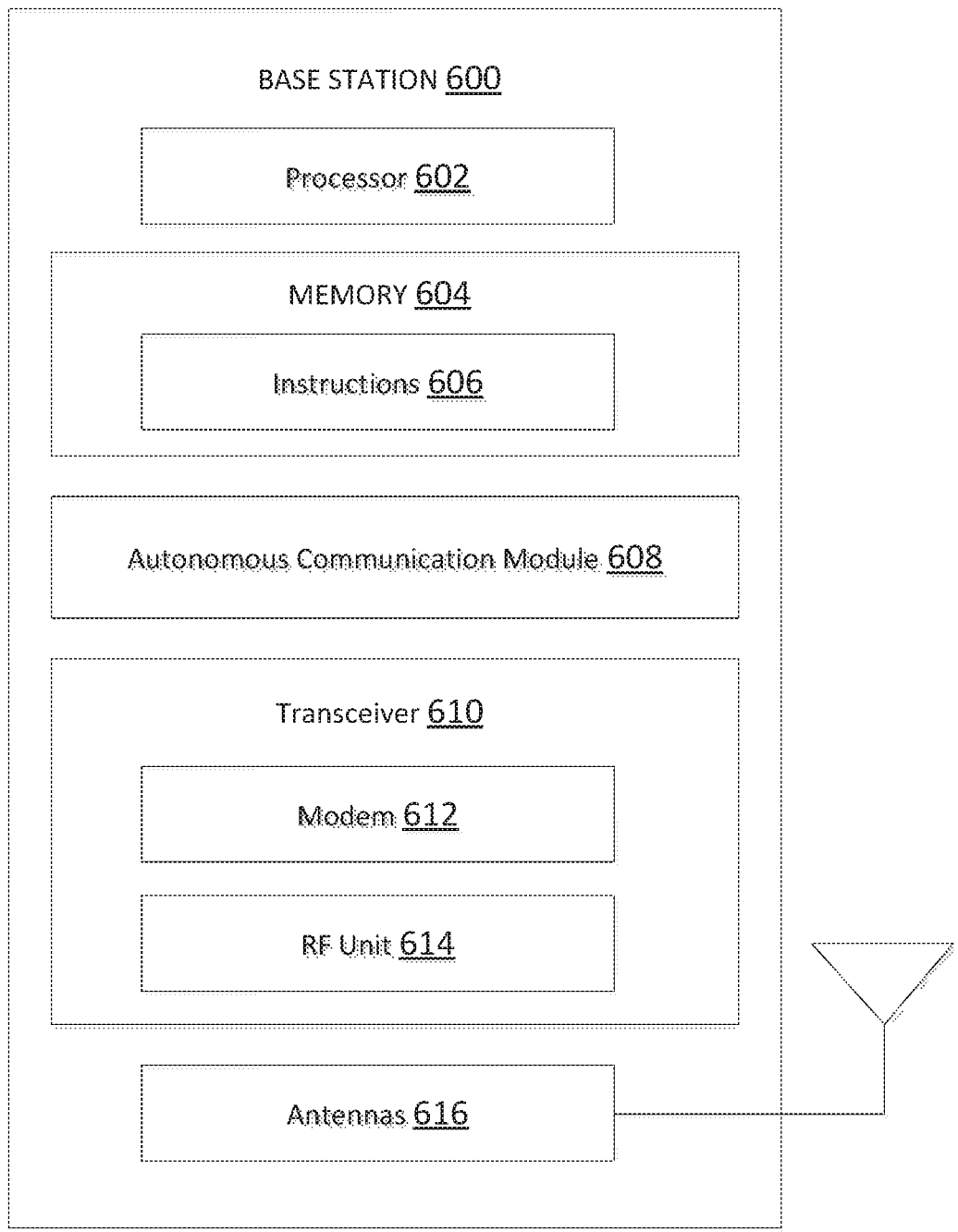
FIG. 6 is a block diagram of an exemplary base station (BS) according to embodiments of the present disclosure.

FIG. 6 is a block diagram of an exemplary BS 600 according to embodiments of the present disclosure. The BS 600 may be a BS 105 or 205 as discussed above. A shown, the BS 600 may include a processor 602, a memory 604, an autonomous communication module 608, a transceiver 610 including a modem subsystem 612 and a RF unit 614, and an antenna 616. These elements may be in direct or indirect communication with each other, for example via one or more buses.

The processor 602 may have various features as a specific-type processor. For example, these may include a CPU, a DSP, an ASIC, a controller, a FPGA device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 604 may include a non-transitory computer-readable medium. The memory 604 may store instructions 606. The instructions 606 may include instructions that, when executed by the processor 602, cause the processor 602 to perform operations described herein. Instructions 606 may also be referred to as code, which may be interpreted broadly to include any type of computer-readable statement(s) as discussed above with respect to FIG. 6.

The autonomous communication module 608 may be used for various aspects of the present disclosure. For example, the autonomous communication module 608 is configured to identify TXOPs in a shared spectrum, identify autonomous transmission frequency bands in the TXOPs, perform network listening, reserve time periods for regular communication and/or autonomous communication over the shared spectrum, as described in greater detail herein.

As shown, the transceiver 610 may include the modem subsystem 612 and the RF unit 614. The transceiver 610 can be configured to communicate bi-directionally with other devices, such as the UEs 115 and 215 and/or another core network element. The modem subsystem 612 may be configured to modulate and/or encode data according to a MCS, e.g., a LDPC coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 215. The RF unit 614 may be further configured to perform analog beamforming in conjunction with the digital beamforming. Although shown as integrated together in transceiver 610, the modem subsystem 612 and the RF unit 614 may be separate devices that are coupled together at the BS 205 to enable the BS 205 to communicate with other devices.

The RF unit 614 may provide the modulated and/or processed data, e.g. data packets (or, more generally, data messages that may contain one or more data packets and other information), to the antenna 616 for transmission to one or more other devices. This may include, for example, transmission of information to complete attachment to a network and communication with a camped UE 215 according to embodiments of the present disclosure. The antenna 616 may further receive data messages transmitted from other devices and provide the received data messages for processing and/or demodulation at the transceiver 610. Although FIG. 6 illustrates antenna 616 as a single antenna, antenna 616 may include multiple antennas of similar or different designs in order to sustain multiple transmission links.

FIGS. 7-13 illustrate autonomous data transmission mechanisms based on the TXOP frame structure 410 of the scheme 400 and may be employed by the BSs 105 and 205 and the UEs 115 and 215. While FIGS. 7-14 illustrate autonomous communications by two operators (e.g., Operator A and Operator B), for purposes of simplicity of discussion, though it will be recognized that embodiments of the present disclosure may scale to many more UEs 215 and/or BSs 205. In FIGS. 7-14, the x-axes represent time in some constant units. The y-axes represent frequency in some constant units.

Figure 7:
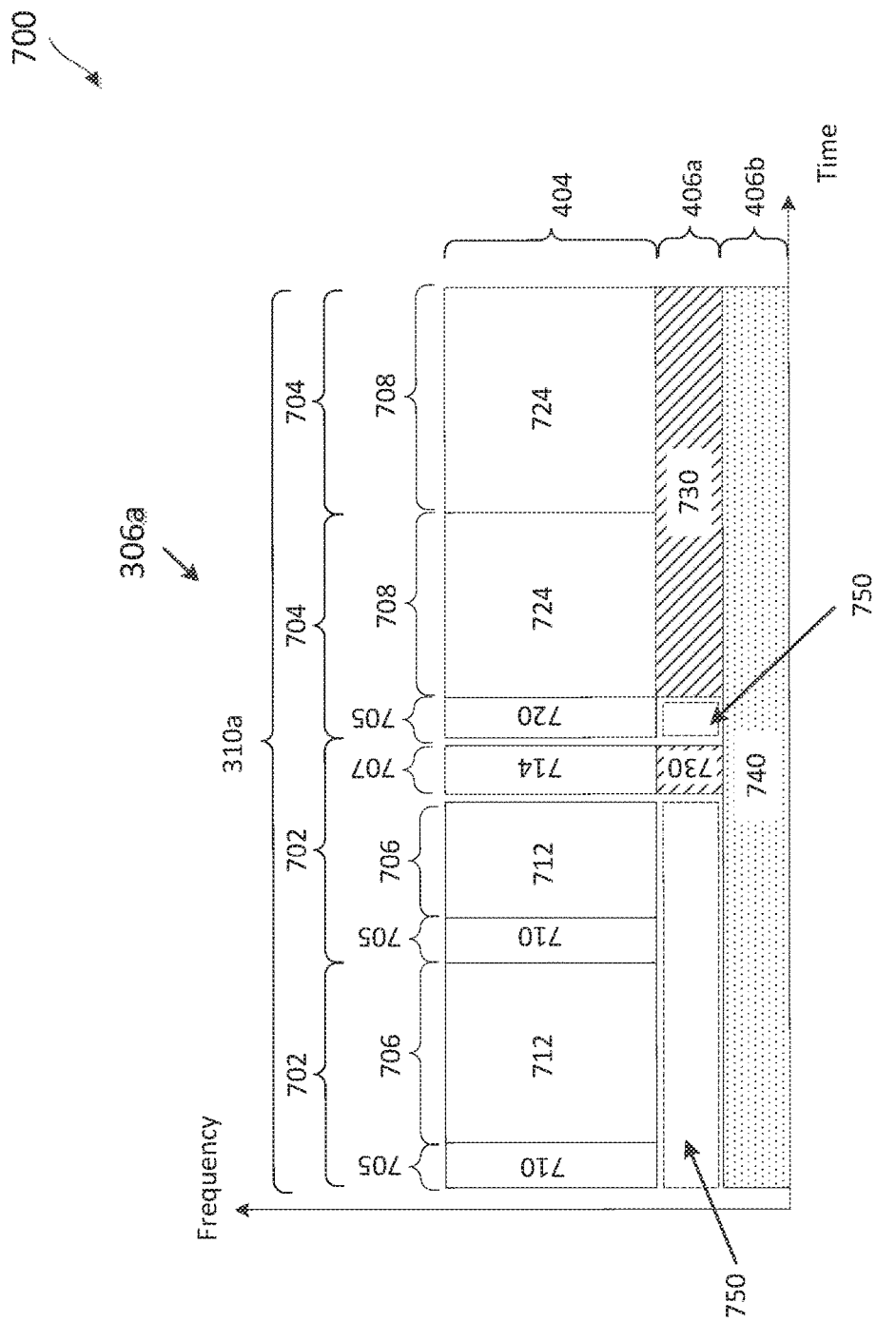
FIG. 7 illustrates an uplink (UL) autonomous data transmission scheme according to embodiments of the present disclosure.

FIG. 7 illustrates a UL autonomous data transmission scheme 700 according to embodiments of the present disclosure. In the scheme 700, a UE may transmit autonomous UL data in an assigned dedicated frequency band 406 during the transmission period 310 of any TXOP 306 when a serving BS has no DL transmission. As an example, the BS 205a (e.g., Operator B) has gained access to the TXOP 306a by employing the reservation mechanisms described in the scheme 300 and uses the TXOP 306a for both DL and UL communications. The transmission period 310a is divided into a plurality of consecutive DL subframes 702 and a plurality of UL consecutive subframes 704 in the shared frequency band 404. Each DL subframe 702 or UL subframe 704 may have a granularity of a slot 314. Each DL subframe 702 may include a DL control portion 705 and a DL data portion 706. The last DL subframe 702 may further include a UL control portion 707. The first UL subframe 704 may include a DL control portion 705 and a UL data portion 708. Subsequent UL sufbrames may include UL data portions 708.

In each DL subframe 702, the BS 205a may transmit a DL control 710 in the DL control portion 705 and DL data 712 in the DL data portions 706. The DL control 710 may indicate DL resource allocations or scheduling information for the following DL data portion 706. The DL data 712 may be transmitted according to the DL resource allocations. The DL data 712 may be referred to as scheduled or regular DL data, which may not be time-critical. In the last DL subframe 702, the UE 215a may transmit a UL control 714 in the UL control portion 707. The UL control 714 may indicate a scheduling request (SR), hybrid automatic repeat request (HARQ) information, and/or channel quality indicator (CQI) information.

In the first UL subframe 704, the BS 205a may transmit a DL control 720 in the DL control portion 705 to indicate UL resource allocations or scheduling information in the following UL data portions 708 or UL subframes 704. For example, the BS 205a may schedule the UE 215a to transmit in the following UL data portions 708. Thus, the UE 215a may transmit UL data 724 in the UL data portions 708 based on the schedule. The UL data 724 may be referred to as scheduled or regular UL data, which may not be time-critical.

While the UE 215a is transmitting the UL control 714 or the UL data 724, the UE 215a or another UE of Operator A may transmit autonomous UL data 730 (e.g., UL URLLC data) in the frequency band 406a designated for autonomous communication by Operator A. While the BS 205a is transmitting in the DL direction, the dedicated frequency band 406a may not be used for UL autonomous transmission as shown by the idle resources 750. A UE (e.g., the UE 215b) of Operator B, which did not win spectrum access in the TXOP 306a, may transmit autonomous data 740 in the frequency band 406b designated for autonomous communication by Operator B.

In an embodiment, a UE may determine whether a serving BS is active or has gained access in a particular TOXP 306 by monitoring the channel (e.g., the shared spectrum) in the CCA periods 308. When the serving BS does not have access in the particular TXOP 306, the UE may transmit autonomous UL data in the assigned dedicated frequency band 406 during the transmission period 310. When the serving BS has access in the particular TXOP 306, the UE may detect CRS and DL control information to determine the format of the transmission period 310 (e.g., the locations of the DL subframes 702 and the UL subframes 704) and avoid transmitting autonomous UL data during the DL control portions 705 and the DL data portions 706.

Figure 8:
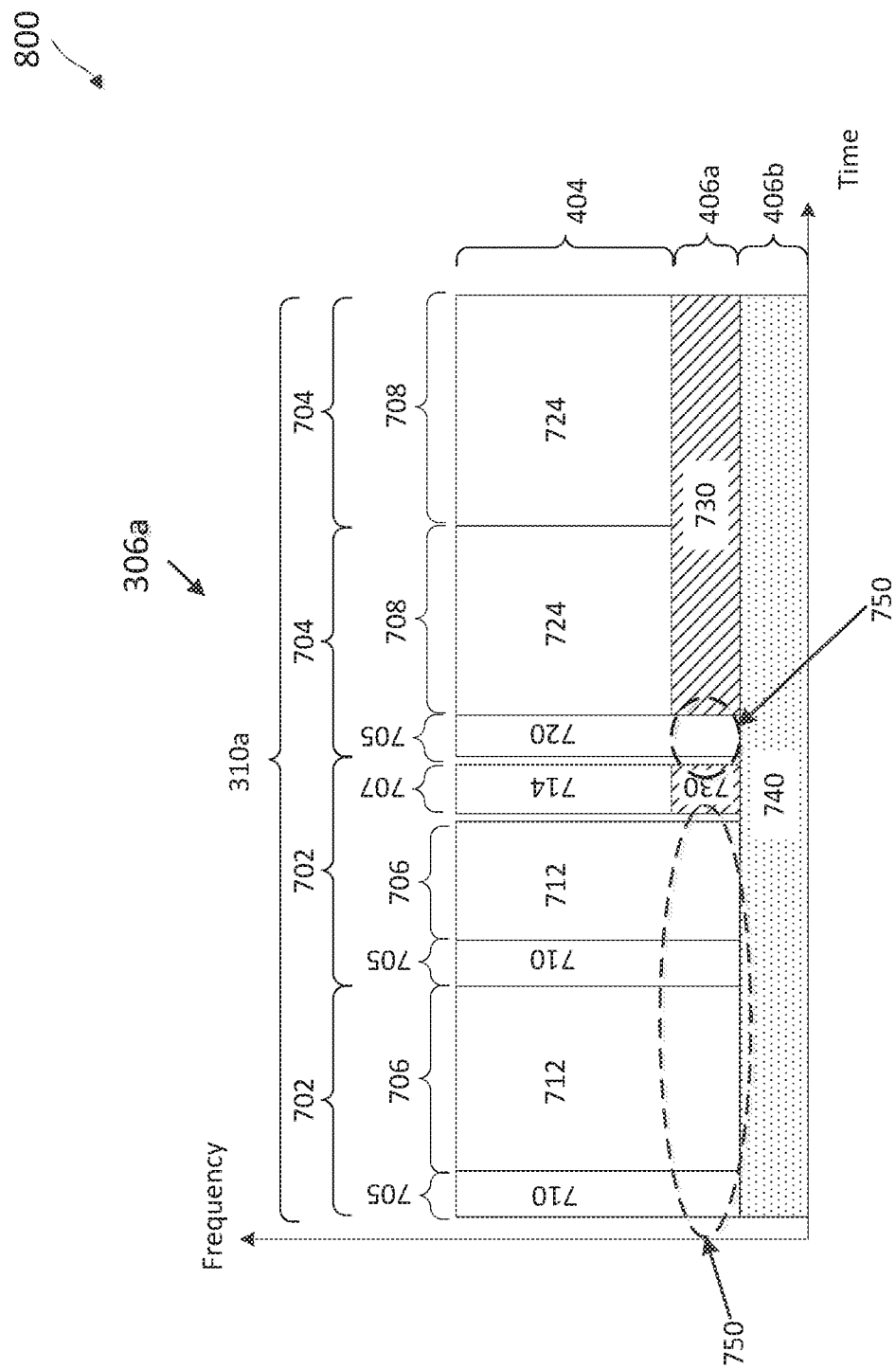
FIG. 8 illustrates a UL autonomous data transmission scheme according to embodiments of the present disclosure.

FIG. 8 illustrates a UL autonomous data transmission scheme 800 according to embodiments of the present disclosure. The scheme 800 is similar to the scheme 700, but the idle resources 750 in the dedicated frequency band 406a may be reclaimed for DL regular transmissions by an operator that has access in the TXOP 306a. As shown, the DL control portions 705 and the DL data portions 706 are extended to include the idle resource 750 in the dedicated frequency band 406a. As an example, the BS 205a has access to the TXOP 306a. Thus, the BS 205a may transmit DL controls 710 and DL data 715 in the shared frequency band 404 and the dedicated frequency band 406a.

In the schemes 700 and 800, the UL and DL transmissions can be based on the granularity determined by the serving cells (e.g., the BSs) instead of the operator. UEs of a particular operator can transmit autonomous UL data in the assigned dedicated frequency band 406 when the serving cells have no DL transmission. Other nodes of the same operator may transmit regular data at the same time in the shared frequency band 402. When the idle resources 750 are reclaimed for DL regular transmissions, cross-link interference may be present between the DL regular transmissions and the UL autonomous transmissions. When an operator supports dynamic TDD, the idle resources 750 can be reclaimed for DL regular transmissions when all nodes of the operator are transmitting in the DL direction. Otherwise, the idle resources 750 are not used for DL transmissions in order to reduce cross-link interference. When an operator does not support dynamic TDD, the idle resources 750 can be reclaimed for DL regular transmissions.

Figure 9:
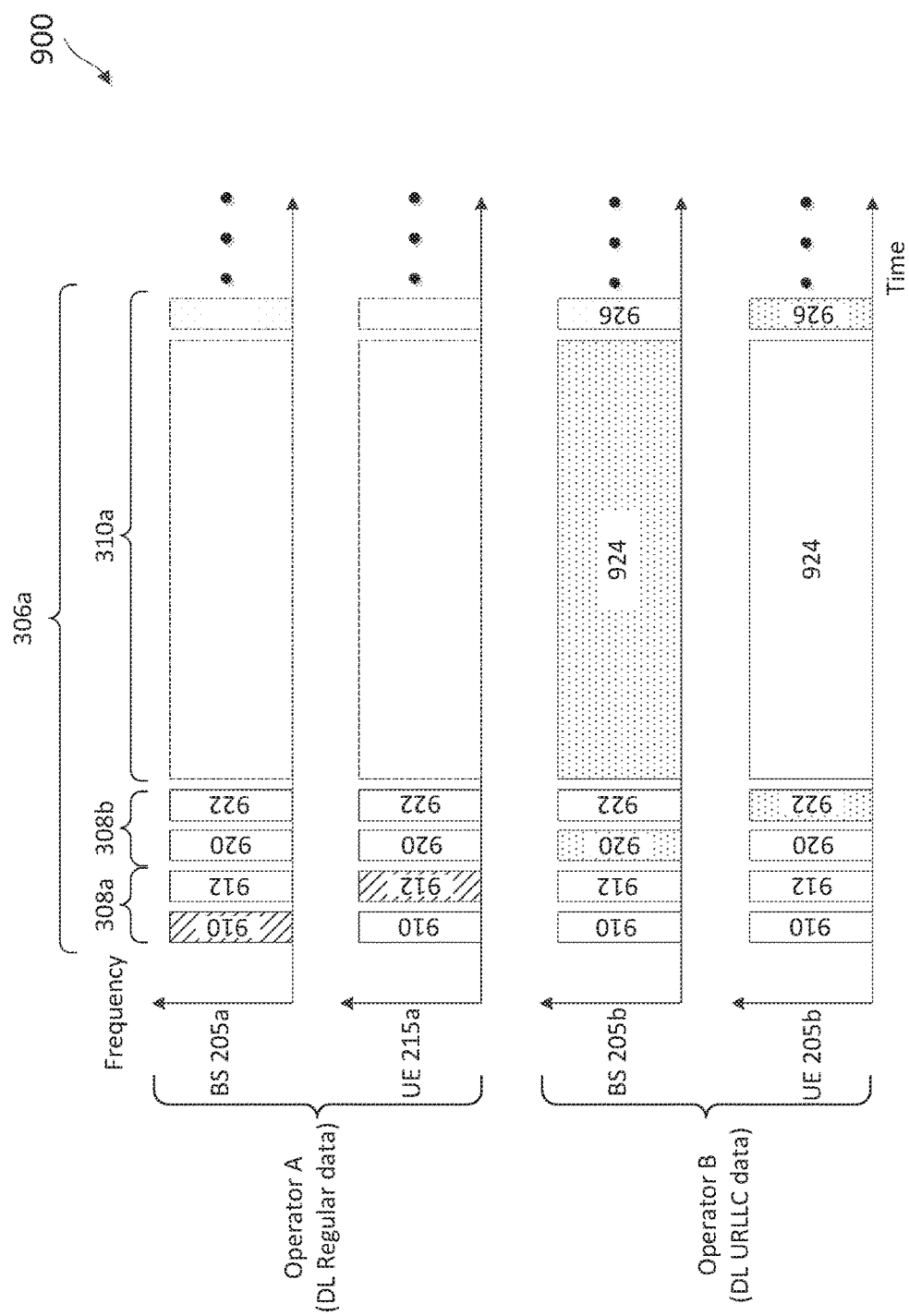
FIG. 9 illustrates a downlink (DL) ultra-reliability low latency communication (URLLC) data transmission scheme according to embodiments of the present disclosure

FIG. 9 illustrates a DL URLLC data transmission scheme 900 according to embodiments of the present disclosure. While a BS may have better control in handling DL URLLC data transmission, the transmission latency of DL URLLC data may be dependent on the amount of traffic at the high priority nodes. For example, when a BS has DL URLLC data for transmission, the BS may access the shared spectrum in a TXOP 306 with prioritized access or in a TXOP 306 with opportunistic access when high priority nodes are not accessing the shared spectrum. In the scheme 900, DL URLLC data transmission has priority over DL regular data transmission. For example, the scheme 900 allows a low priority BS with DL URLLC data to override the access priority of a high priority BS with regular DL data. The scheme 900 may be employed in conjunction with the schemes 300, 400, 700, and 800. In FIG. 9, the patterned boxes represent transmit signals and the empty boxes represent receive signals. The dashed boxes are included as references to the structure of the TXOP frame structure 410 without signal transmission or reception.

As an example, the BS 205a has regular DL data for transmission and the BS 205b has DL URLLC data for transmission in a TXOP 306a where Operator A has priority over Operator B. The BS 205a may transmit a reservation request signal 910 in the CCA period 308a. The reservation request signal 910 may indicate that the reservation is for DL regular data transmission. The UE 215a may respond by transmitting a reservation response signal 912 in the CCA period 308a. The BS 205b and the UE 215b may receive the reservation request signal 910 and the reservation response signal 912. Since, the BS205b has DL URLLC data for transmission, which is time-critical, the BS 205b may transmit a reservation request signal 920 in the CCA period 308b. The reservation request signal 920 may indicate that the reservation is for DL URLLC data transmission. The UE 215b may respond by transmitting a reservation response signal 922 in the CCA period 308b. When the high priority BS 205a has regular DL data and detected that the reservation from the low priority BS 205b is for DL URLLC data, the high priority BS 205a may yield access to the low priority BS 205b with the DL URLLC data. As shown, the BS 205a refrains from transmitting regular DL data in the transmission period 310a so that the BS 205b can transmit the DL URLLC data 924 in the transmission period 310a.

The UE 215b may transmit a UL control 926 in the transmission period 310a. The scheme 900 may perform well when high priority nodes do not have a large amount of DL URLLC traffic. However, the latency may increase when the amount of DL URLLC traffic at the high priority nodes increases.

Figure 10:
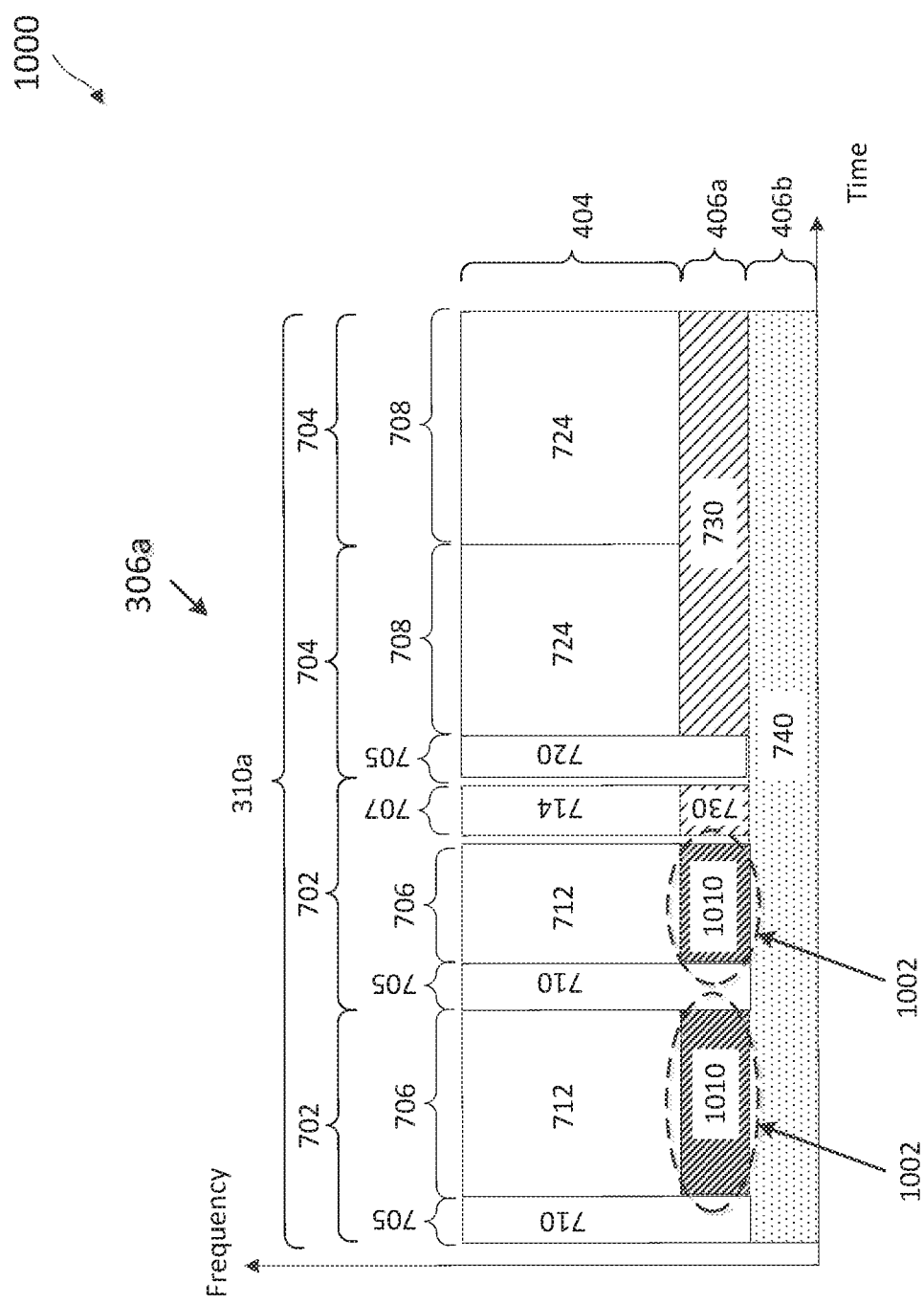
FIG. 10 illustrates a UL and DL autonomous data transmission scheme according to embodiments of the present disclosure.

FIG. 10 illustrates an UL and DL autonomous data transmission scheme 1000 according to embodiments of the present disclosure. The scheme 1000 is similar to the scheme 800, but allows an operator that has access to the TXOP 306a to use portions 1002 of the idle resources 750 for DL autonomous data transmissions. As shown, the DL control portions 705 include both the shared frequency band 404 and the dedicated frequency band 406a similar to the scheme 800, but the DL data portions 706 only include the shared frequency band 404. The portions 1002 of dedicated frequency band 406a adjacent to the DL data portions 706 are used for DL autonomous data transmissions. As an example, the BS 205a has access to the TXOP 306a. Thus, the BS 205a may transmit DL controls 710 in the shared frequency band 404 and the dedicated frequency band 406a and DL data 712 in the shared frequency band 404. The BS 205a may additionally transmit DL autonomous data 1010 at the same time as the DL data 712 in the dedicated frequency band 406a.

Figure 11:
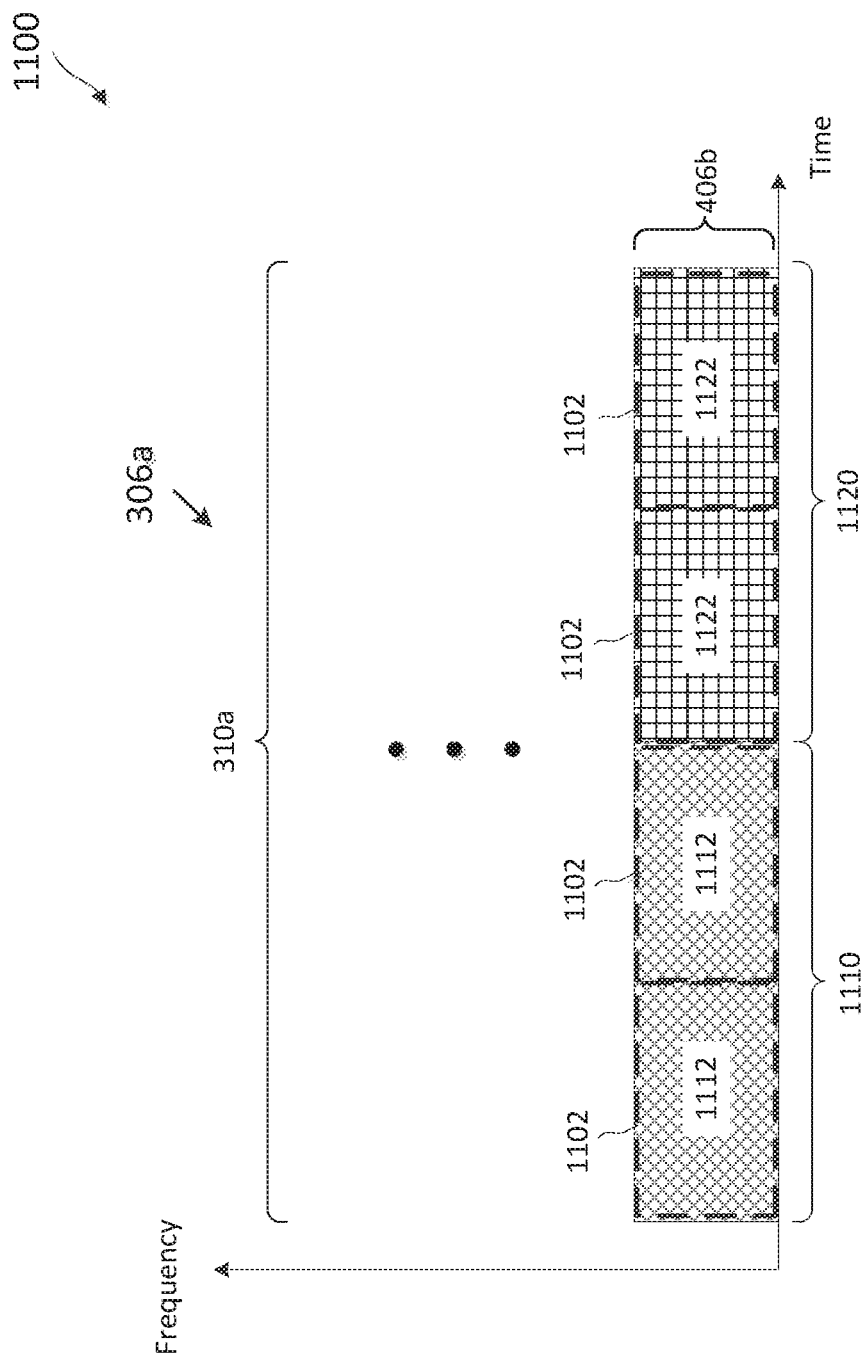
FIG. 11 illustrates a UL and DL autonomous data transmission scheme according to embodiments of the present disclosure.

FIG. 11 illustrates a UL and DL autonomous data transmission scheme 1100 according to embodiments of the present disclosure. The scheme 1100 is similar to the scheme 1000 and provides a more detailed view of UL and DL autonomous data transmissions by an operator without access to a TXOP. In the scheme 1100, an operator without access to the TXOP 306a may semi-statically or dynamically divide the dedicated frequency band 406b into a DL portion 1110 and a UL portion 1120. As an example, the BS 205b does not have access in the TXOP 306a and is assigned with the dedicated frequency band 406b. The BS 205b may pre-configure a UL/DL split ratio of 50/50. For example, the dedicated frequency band 406 includes 4 subframes 1102, where each of the the DL portion 1110 may include 2 subframes 1102 and the UL portion 1120 may include the other 2 subframes 1102. The BS 205b may transmit DL autonomous data 1112 in the DL portion 1110 and allow a UE (e.g., the UE 215b) of the BS 205b to transmit UL autonomous data 1122 in the UL portion 1120. Alternatively, the BS 205b may dynamically configure the UL/DL split ratio in a TXOP 306 based to the amount of DL URLLC traffic and UL URLLC traffic observed in a previous TXOP 306. However, the BS 205b may not dynamically switch the link direction within a TXOP 306.

Figure 12:
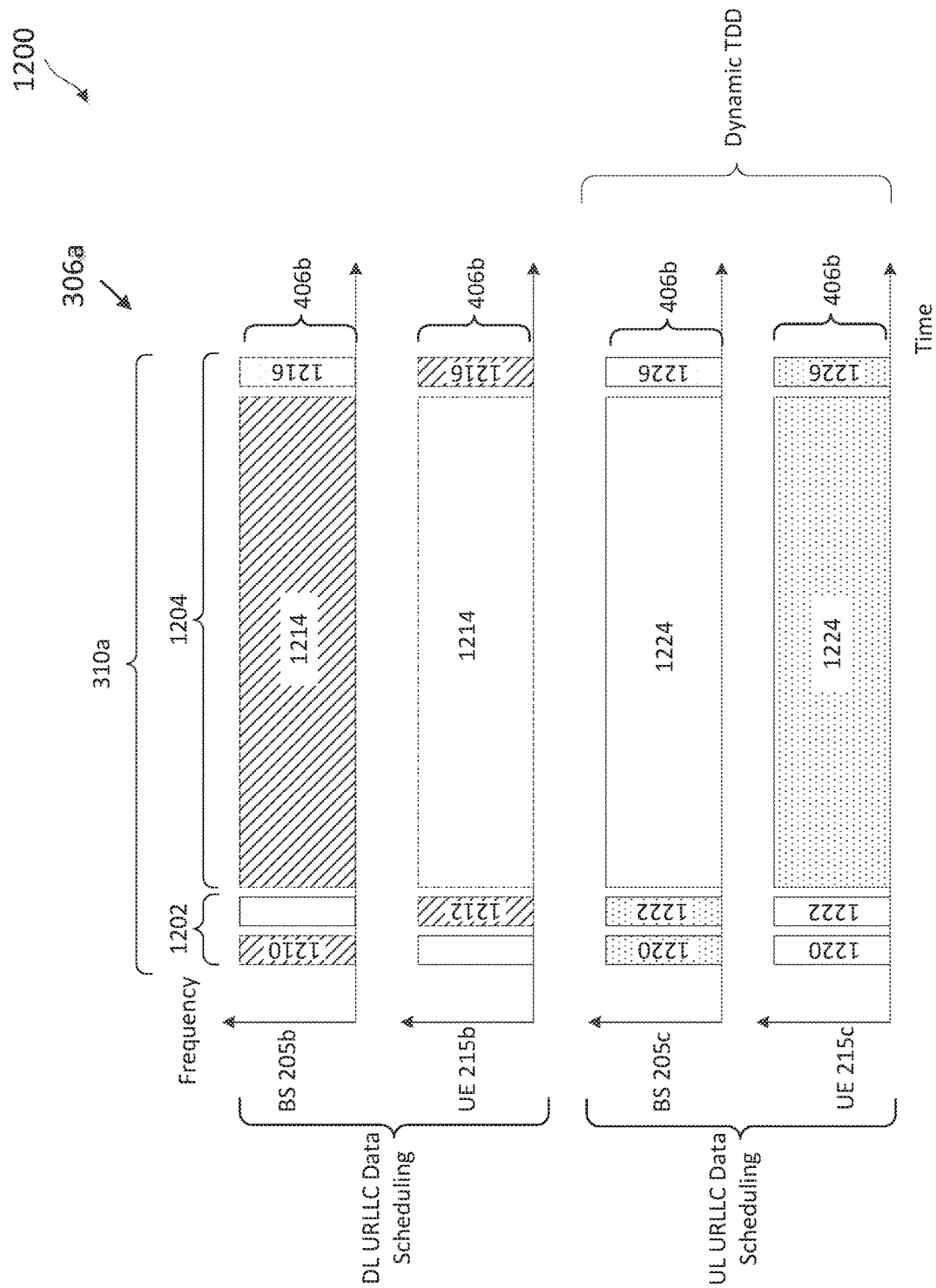
FIG. 12 illustrates a dynamic time-division duplexing (TDD) scheme for UL and DL autonomous data transmissions according to embodiments of the present disclosure.

FIG. 12 illustrates a dynamic TDD scheme 1200 for UL and DL autonomous data transmissions according to embodiments of the present disclosure. The scheme 1200 may be employed in conjunction with the schemes 300, 400, 700, 800, 900, 1000, and/or 1100. The scheme 1200 allows a BS to dynamically switch the link priority in an assigned dedicated frequency band 406. As an example, Operator B does not have access in the TXOP 306a and is assigned with the dedicated frequency band 406b. As shown, the dedicated frequency band 406b includes priority-based CCA periods 1202 similar to the CCA periods 308 and a transmission period 1204 similar to the transmission period 310. For example, the link priority is DL in the dedicated frequency band 406b during the transmission period 310. The BS 205b may transmit a reservation request signal 1210 (e.g., a DL trigger) in the CCA period 1202 to reserve the transmission period 1204 for DL URLLC data transmission. The UE 215b (e.g., the target receiver for the DL URLLC transmission)

may respond with a reservation response signal 1212 (e.g., a SRS). The BS 205*b* may transmit DL URLLC data 1214 in the transmission period 1204 and the UE 215*b* may transmit a UL control 1216 in the transmission period 1204.

When the BS 205*c* has UL URLLC data for transmission, the BS 205*c* may transmit a reservation request signal 1220 (e.g., a UL trigger) in the CCA period 1202 to reserve the transmission period 1204 for a UL URLLC transmission. The BS 205*c* (e.g., the target receiver for the UL URLLC transmission) may transmit a reservation response signal 1222 (e.g., a CRS) in the CCA period 1202 to reserve the transmission period 1204 for a UL transmission. The reservation request signals 1210 and 1220 may be transmitted using the same resources, for example, when control-on-control channel inference may be minimal or acceptable. The reservation response signals 1212 and 1222 may be transmitted using orthogonal resources so that the target transmitters (e.g., the BS 205*b* and the UE 215*c*) may detect the reservation response signals 1212 and 1222.

When the UE 215*c* (e.g., the target transmitter) detects the reservation response signal 1212 from the UE 215*b*, the UE 215*c* may refrain from switching the link priority to a UL direction for the UL transmission. When the UE 215*c* does not detect the reservation response signal 1212 from the UE 215*b*, the UE 215*c* may switch the link priority to UL. For example, the BS 205*b* did not reserve the transmission period 1204 or the BS 205*b* may be far away from the BS 205*c*, and thus may not cause significant interference. As such, the UE 215*c* may transmit UL URLLC data 1224 autonomously and a UL control 1226 in the transmission period 1204. While the scheme 1200 is illustrated with a default link priority of DL, similar mechanisms may be employed to switch a link priority from a UL direction to a DL direction.

Figure 13:
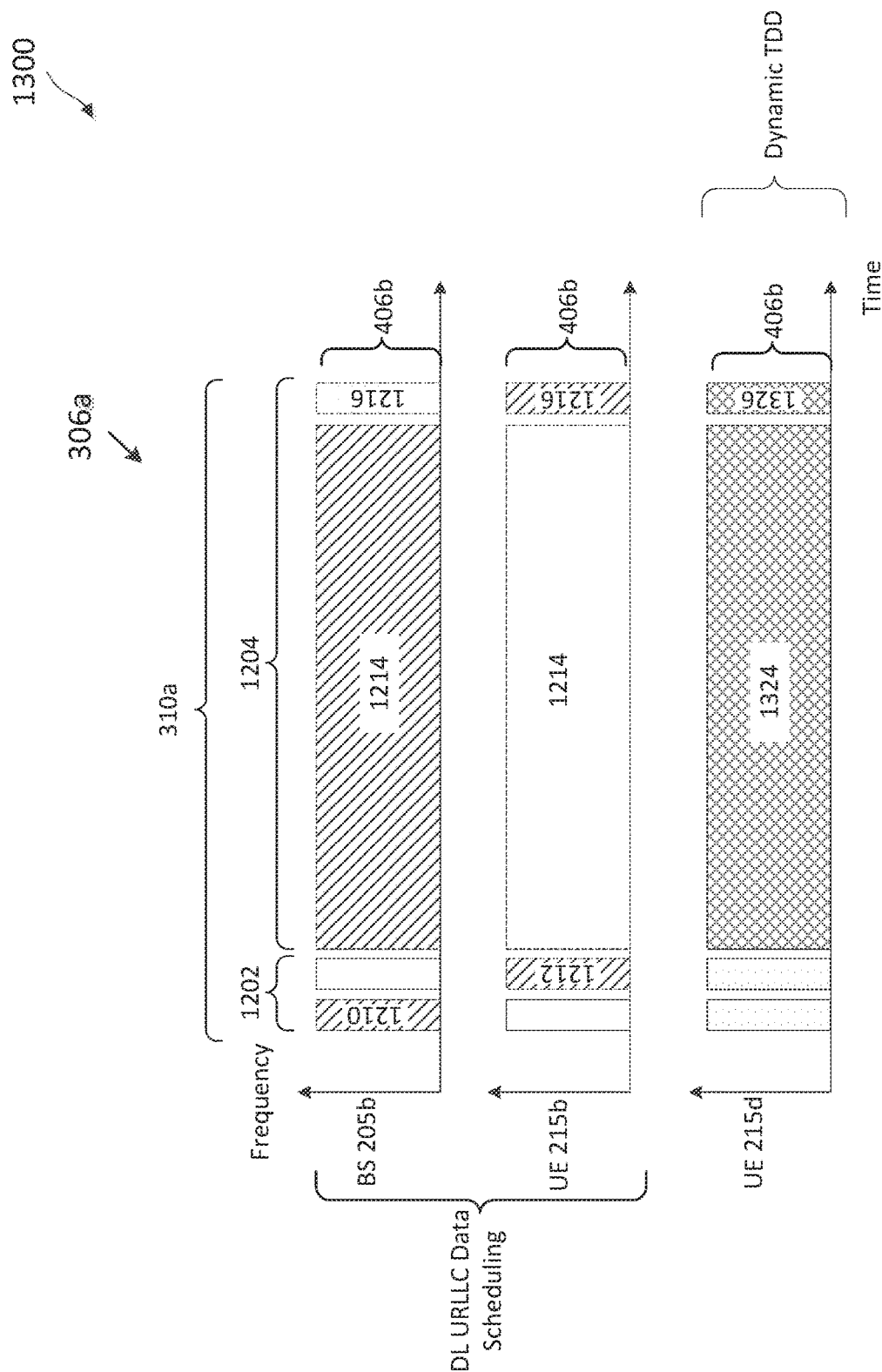
FIG. 13 illustrates a dynamic TDD scheme for UL and DL autonomous data transmissions according to embodiments of the present disclosure.

FIG. 13 illustrates a dynamic TDD scheme 1300 for UL and DL autonomous data transmissions according to embodiments of the present disclosure. The scheme 1300 may be employed in conjunction with the schemes 700, 800, 900, 1000, 1100, and/or 1200. The scheme 1300 allows a UE to switch the link priority in an assigned dedicated frequency band 406. As an example, Operator B does not have access in the TXOP 306*a* and is assigned with the dedicated frequency band 406*b* and the link priority in the transmission period 310*a* is DL. Similar to the scheme 1200, the BS 205*b* may transmit a reservation request signal 1210 in the CCA period 1202 to reserve the transmission period 1204 for DL URLLC data transmission. The UE 215*b* may respond with a reservation response signal 1212. The BS 205*b* may transmit DL URLLC data 1214 in the transmission period 1204 and the UE 215*b* may transmit a UL control 1216 in the transmission period 1204.

The UE 215*d* may have UL URLLC data for transmission. The UE 215*d* may transmit a SR to the BS 205*b* to request a UL URLLC schedule. If the UE 215*d* did not receive a UL URLLC schedule, the UE 215*d* may listen to the channel in the CCA period 1202. If the UE 215*d* did not detect the reservation request signal 1210 and the reservation response signal 1212, the UE 215*d* may switch the link priority to UL and transmit UL URLLC data 1324 and a UL control 1326 in the transmission period 1204. While the scheme 1300 is illustrated with a default link priority of DL, similar mechanisms may be employed to switch a link priority from a UL direction to a DL direction.

Figure 14:
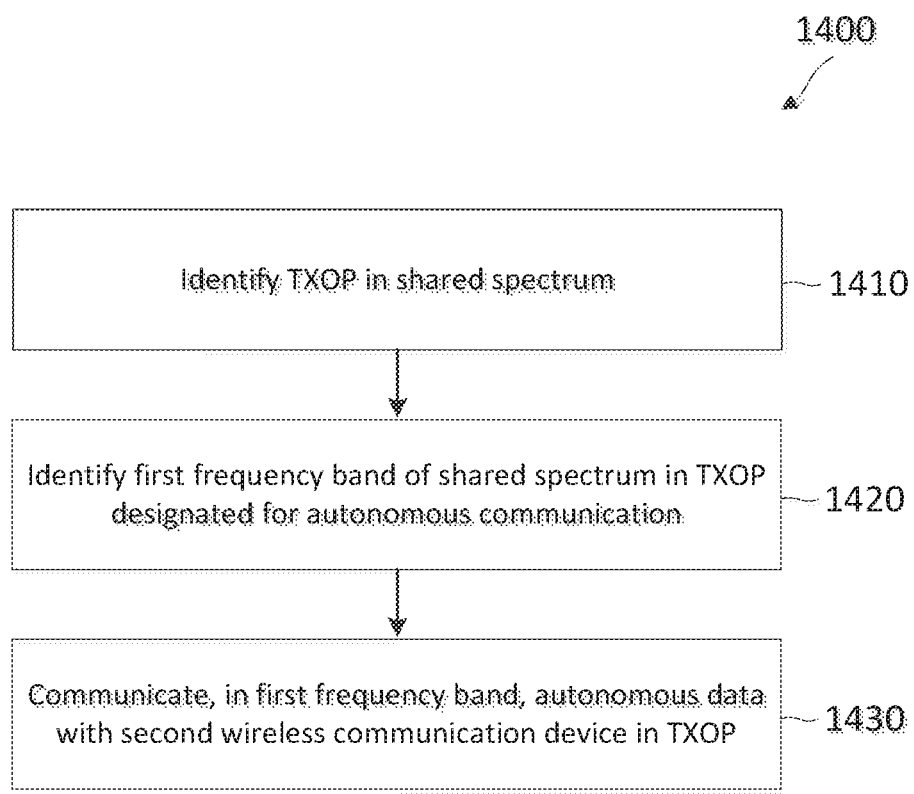
FIG. 14 is a flow diagram of a method of transmitting autonomous data over a shared spectrum according to embodiments of the present disclosure.

FIG. 14 is a flow diagram of a method 1400 of transmitting autonomous data over a shared spectrum according to embodiments of the present disclosure. Steps of the method 1400 can be executed by a computing device (e.g., a processor, processing circuit, and/or other suitable component) of a wireless communication device, such as the BSs 105, 205, and 600 and the UEs 115, 215, and 500. The method 1400 may employ similar mechanisms as in the schemes 400, 700, 800, 900, 1000, 1100, and 1200 described with respect to FIGS. 4, 8, 9, 10, 11, and 12, respectively. As illustrated, the method 1400 includes a number of enumerated steps, but embodiments of the method 1400 may include additional steps before, after, and in between the enumerated steps. In some embodiments, one or more of the enumerated steps may be omitted or performed in a different order.

At step 1410, the method 1400 includes identifying a TXOP (e.g., the TXOP 306) in a shared spectrum (e.g., over the frequency band 402) shared by the plurality of network operating entities (e.g., Operator A and Operator B). For example, the wireless communication device (e.g., the BS 205*a* or the UE 215*a*) is associated with a first network operating entity (e.g., Operator A) of the plurality of the network operating entities.

At step 1420, the method 1400 includes identifying a first frequency band (e.g., the dedicated frequency band 406*a*) of the shared spectrum designated for autonomous communication by the first network operating entity during the TXOP.

At step 1430, the method 1400 includes communicating, in the first frequency band, autonomous data (e.g., the autonomous data 730, 740, and 1010 and the URLLC data 1224 and 1324) with a second wireless communication device (e.g., the UE 215*a* or the BS 205*a*) associated with the first network operating entity during the TXOP. The autonomous data may include UL URLLC data and DL URLLC data and may be communicated based on the schemes 700, 800, 900, 1000, 1100, 1200, and/or 1300.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication, comprising identifying, by a first wireless communication device associated with a first network operating entity of a plurality of network operating entities, a transmission opportunity (TXOP) in a shared spectrum shared by the plurality of network operating entities; identifying, by the first wireless communication device, a first frequency band of the shared spectrum designated for autonomous communication by the first network operating entity during the TXOP; and communicating, by the first wireless communication device with a second wireless communication device associated with the first network operating entity in the first frequency band, autonomous data during the TXOP.

In some embodiments, wherein the first network operating entity has priority among the plurality of network operating entities for communicating in the TXOP. In some embodiments, wherein a second frequency band of the shared spectrum is designated for regular communication by the first network operating entity during the TXOP, and wherein the method comprises communicating, by the first wireless communication device, regular data with a third wireless communication device associated with the first network operating entity in the second frequency band based on a regular schedule. In some embodiments, wherein the autonomous data is communicated independent of the regular schedule. In some embodiments, wherein the regular data and the autonomous data are communicated at the same time in an uplink (UL) direction. In some embodiments, wherein the regular data and the autonomous data are communicated at the same time in a downlink (DL) direction. In some embodiments, wherein the regular data is communicated in a downlink (DL) direction, and wherein the regular data is further communicated in the first frequency band during the TXOP. In some embodiments, the method further comprises communicating, by the first wireless communication device with a third wireless communication device associated with the first network operating entity in a second frequency band of the shared spectrum, another autonomous data in another TXOP, wherein the first network operating entity does not have priority among the plurality of network operating entities in the another TXOP, and wherein the second frequency band in the another TXOP is designated for autonomous communication by the first network operating entity. In some embodiments, wherein the first frequency band and the second frequency band are different frequency bands. In some embodiments, the method further comprises transmitting, by the first wireless communication device in a first channel sensing period of another TXOP, a reservation for regular communication in a transmission period of the another TXOP; detecting, by the first wireless communication device in a second channel sensing period of the another TXOP, a reservation for time-critical communication in the transmission period from a second network operating entity of the plurality of network operating entities; and refraining, by the first wireless communication device, from the regular communication in the transmission period based on the detecting. In some embodiments, the method further comprises transmitting, by the first wireless communication device in a channel sensing period of another TXOP, a reservation for time-critical communication in a transmission period of the another TXOP, wherein the first network operating entity does not have priority among the plurality of network operating entities in the another TXOP; and communicating, by the first wireless communication device, time-critical data in the transmission period. In some embodiments, wherein a link priority of at least a portion of the TXOP in the first frequency band is in a downlink (DL) direction. In some embodiments, wherein the autonomous data is communicated in an uplink (UL) direction in the at least a portion of the TXOP. In some embodiments, wherein the communicating includes monitoring, by the first wireless communication device, in a channel sensing period of the TXOP, the first frequency band for a reservation for DL autonomous communication; and switching, by the first wireless communication device, dynamically the link priority of the at least a portion of the TXOP from the DL direction to the UL direction based on the monitoring.

Further embodiments of the present disclosure include an apparatus comprising a processor configured to identify a transmission opportunity (TXOP) in a shared spectrum shared by a plurality of network operating entities, wherein the apparatus is associated with a first network operating entity of the plurality of network operating entities; and identify a first frequency band of the shared spectrum designated for autonomous communication by the first network operating entity during the TXOP; and a transceiver configured to communicate, with a first wireless communication device associated with the first network operating entity in the first frequency band, autonomous data during the TXOP.

In some embodiments, wherein the first network operating entity has priority among the plurality of network operating entities for communicating in the TXOP. In some embodiments, wherein a second frequency band of the shared spectrum is designated for regular communication by the first network operating entity during the TXOP, and wherein the transceiver is further configured to communicate regular data with a second wireless communication device associated with the first network operating entity in the second frequency band on a regular schedule. In some embodiments, wherein the autonomous data is communicated independent of the regular schedule. In some embodiments, wherein the regular data and the autonomous data are communicated at the same time in an uplink (UL) direction. In some embodiments, wherein the regular data and the autonomous data are communicated at the same time in a downlink (DL) direction. In some embodiments, wherein the regular data is communicated in a downlink (DL) direction, and wherein the regular data is further communicated in the first frequency band during the TXOP. In some embodiments, wherein the transceiver is further configured to communicate, with a second wireless communication device associated with the first network operating entity in a second frequency band of the shared spectrum, another autonomous data in another TXOP, wherein the first network operating entity does not have priority among the plurality of network operating entities in the another TXOP, and wherein the second frequency band in the another TXOP is designated for autonomous communication by the first network operating entity. In some embodiments, wherein the first frequency band and the second frequency band are different frequency bands. In some embodiments, wherein the transceiver is further configured to transmit, in a first channel sensing period of another TXOP, a reservation for regular communication in a transmission period of the another TXOP, and wherein the processor is further configured to detect, in a second channel sensing period of the another TXOP, a reservation for time-critical communication in the transmission period from a second network operating entity of the plurality of network operating entities; and refrain from the regular communication in the transmission period based on the detecting. In some embodiments, wherein the transceiver is further configured to transmit, in a channel sensing period of another TXOP, a reservation for time-critical communication in a transmission period of the another TXOP, wherein the first network operating entity does not have priority among the plurality of network operating entities in the another TXOP; and communicate time-critical data in the transmission period. In some embodiments, wherein a link priority of at least a portion of the TXOP in the first frequency band is in a downlink (DL) direction. In some embodiments, wherein the autonomous data is communicated in an uplink (UL) direction in the at least a portion of the TXOP. In some embodiments, wherein the transceiver is further configured to communicate with the first wireless communication device by monitoring in a channel sensing period of the TXOP, the first frequency band for a reservation for DL autonomous communication; and switching dynamically the link priority of the at least a portion of the TXOP from the DL direction to the UL direction based on the monitoring.

Further embodiments of the present disclosure include a computer-readable medium having program code recorded thereon, the program code comprising code for causing a first wireless communication device to identify a transmission opportunity (TXOP) in a shared spectrum shared by a plurality of network operating entities, wherein the first wireless communication device is associated with a first network operating entity of the plurality of network operating entities; code for causing the first wireless communication device to identify a first frequency band of the shared spectrum designated for autonomous communication by the first network operating entity during the TXOP; and code for causing the first wireless communication device to communicate, with a second wireless communication device associated with the first network operating entity in the first frequency band, autonomous data during the TXOP.

In some embodiments, wherein the first network operating entity has priority among the plurality of network operating entities for communicating in the TXOP. In some embodiments, wherein a second frequency band of the shared spectrum is designated for regular communication by the first network operating entity during the TXOP, and wherein the computer-readable medium further comprises code for causing the first wireless communication device to communicating, by the first wireless communication device, regular data with a third wireless communication device associated with the first network operating entity in the second frequency band on a regular schedule. In some embodiments, wherein the autonomous data is communicated independent of the regular schedule. In some embodiments, wherein the regular data and the autonomous data are communicated at the same time in an uplink (UL) direction. In some embodiments, wherein the regular data and the autonomous data are communicated at the same time in a downlink (DL) direction. In some embodiments, wherein the regular data is communicated in a downlink (DL) direction, and wherein the regular data is further communicated in the first frequency band during the TXOP. In some embodiments, the computer-readable medium further comprises code for causing the first wireless communication device to communicate, with a third wireless communication device associated with the first network operating entity in a second frequency band of the shared spectrum, another autonomous data in another TXOP, wherein the first network operating entity does not have priority among the plurality of network operating entities in the another TXOP, and wherein the second frequency band in the another TXOP is designated for autonomous communication by the first network operating entity. In some embodiments, wherein the first frequency band and the second frequency band are different frequency bands. In some embodiments, the computer-readable medium further comprises code for causing the first wireless communication device to transmit, in a first channel sensing period of another TXOP, a reservation for regular communication in a transmission period of the another TXOP; code for causing the first wireless communication device to detect, in a second channel sensing period of the another TXOP, a reservation for time-critical communication in the transmission period from a second network operating entity of the plurality of network operating entities; and code for causing the first wireless communication device to from the regular communication in the transmission period based on the detecting. In some embodiments, the computer-readable medium further comprises code for causing the first wireless communication device to transmit, in a channel sensing period of another TXOP, a reservation for time-critical communication in a transmission period of the another TXOP, wherein the first network operating entity does not have priority among the plurality of network operating entities in the another TXOP; and code for causing the first wireless communication device to time-critical data in the transmission period. In some embodiments, wherein a link priority of at least a portion of the TXOP in the first frequency band is in a downlink (DL) direction. In some embodiments, wherein the autonomous data is communicated in an uplink (UL) direction in the at least a portion of the TXOP. In some embodiments, wherein the code for communicating with the second wireless communication device is further configured to monitor, in a channel sensing period of the TXOP, the first frequency band for a reservation for DL autonomous communication; and switch dynamically the link priority of the at least a portion of the TXOP from the DL direction to the UL direction based on the monitoring.

Further embodiments of the present disclosure include an apparatus comprising means for identifying a transmission opportunity (TXOP) in a shared spectrum shared by a plurality of network operating entities, wherein the apparatus is associated with a first network operating entity of the plurality of network operating entities; means for identifying a first frequency band of the shared spectrum designated for autonomous communication by the first network operating entity during the TXOP; and means for communicating, with a first wireless communication device associated with the first network operating entity in the first frequency band, autonomous data during the TXOP.

In some embodiments, wherein the first network operating entity has priority among the plurality of network operating entities for communicating in the TXOP. In some embodiments, wherein a second frequency band of the shared spectrum is designated for regular communication by the first network operating entity during the TXOP, and wherein the apparatus further comprises means for communicating regular data with a second wireless communication device associated with the first network operating entity in the second frequency band on a regular schedule. In some embodiments, wherein the autonomous data is communicated independent of the regular schedule. In some embodiments, wherein the regular data and the autonomous data are communicated at the same time in an uplink (UL) direction. In some embodiments, wherein the regular data and the autonomous data are communicated at the same time in a downlink (DL) direction. In some embodiments, wherein the regular data is communicated in a downlink (DL) direction, and wherein the regular data is further communicated in the first frequency band during the TXOP. In some embodiments, the apparatus further comprises means for communicating, with a second wireless communication device associated with the first network operating entity in a second frequency band of the shared spectrum, another autonomous data in another TXOP, wherein the first network operating entity does not have priority among the plurality of network operating entities in the another TXOP, and wherein the second frequency band in the another TXOP is designated for autonomous communication by the first network operating entity. In some embodiments, wherein the first frequency band and the second frequency band are different frequency bands. In some embodiments, the apparatus further comprises means for transmitting, in a first channel sensing period of another TXOP, a reservation for regular communication in a transmission period of the another TXOP; means for detecting, in a second channel sensing period of the another TXOP, a reservation for time-critical communication in the transmission period from a second network operating entity of the plurality of network operating entities; and means for refraining from the regular communication in the transmission period based on the detecting. In some embodiments, the apparatus further comprises means for transmitting, in a channel sensing period of another TXOP, a reservation for time-critical communication in a transmission period of the another TXOP, wherein the first network operating entity does not have priority among the plurality of network operating entities in the another TXOP; and means for communicating time-critical data in the transmission period. In some embodiments, wherein a link priority of at least a portion of the TXOP in the first frequency band is in a downlink (DL) direction. In some embodiments, wherein the autonomous data is communicated in an uplink (UL) direction in the at least a portion of the TXOP. In some embodiments, wherein the means for communicating with the first wireless communication device is further configured to monitor in a channel sensing period of the TXOP, the first frequency band for a reservation for DL autonomous communication; and switch dynamically the link priority of the at least a portion of the TXOP from the DL direction to the UL direction based on the monitoring.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   identifying, by a first wireless communication device associated with a first network operating entity of a plurality of network operating entities, a transmission opportunity (TXOP) in a shared spectrum shared by the plurality of network operating entities, the TXOP including a plurality of frequency bands in the shared spectrum designated for autonomous communication by different network operating entities of the plurality of network operating entities, wherein the first network operating entity has priority among the plurality of network operating entities for communicating in the TXOP;
   identifying, by the first wireless communication device, a first frequency band designated for autonomous communication by the first network operating entity during the TXOP from among the plurality of frequency bands, wherein a second frequency band in the shared spectrum different from the plurality of frequency bands is designated for regular communication by the first network operating entity during the TXOP;
   communicating, by the first wireless communication device with a second wireless communication device associated with the first network operating entity in the first frequency band, autonomous data during the TXOP; and
   communicating, by the first wireless communication device with a third wireless communication device associated with the first network operating entity in the first frequency band and the second frequency band, regular data in a downlink (DL) direction during the TXOP based on a regular schedule.

2. The method of claim 1, wherein the autonomous data is communicated independent of the regular schedule.

3. The method of claim 1, further comprising:
   communicating, by the first wireless communication device with a fourth wireless communication device associated with the first network operating entity in the second frequency band, another regular data in an uplink (UL) direction during the TXOP based on another regular schedule,
   wherein the autonomous data is communicated in the UL direction at the same time as the another regular data.

4. The method of claim 1, further comprising communicating, by the first wireless communication device with a fourth wireless communication device associated with the first network operating entity in a third frequency band of the plurality of frequency bands, another autonomous data in another TXOP, wherein the first network operating entity does not have priority among the plurality of network operating entities in the another TXOP, and wherein the third frequency band in the another TXOP is designated for autonomous communication by the first network operating entity.

5. The method of claim 4, wherein the first frequency band and the third frequency band are different frequency bands.

6. The method of claim 1, further comprising:
   transmitting, by the first wireless communication device in a first channel sensing period of another TXOP, a reservation for regular communication in a transmission period of the another TXOP;
   detecting, by the first wireless communication device in a second channel sensing period of the another TXOP, a reservation for time-critical communication in the transmission period from a second network operating entity of the plurality of network operating entities; and
   refraining, by the first wireless communication device, from the regular communication in the transmission period based on the detecting.

7. The method of claim 1, further comprising:
   transmitting, by the first wireless communication device in a channel sensing period of another TXOP, a reservation for time-critical communication in a transmission period of the another TXOP, wherein the first network operating entity does not have priority among the plurality of network operating entities in the another TXOP; and communicating, by the first wireless communication device, time-critical data in the transmission period.

8. The method of claim 1, wherein a link priority of at least a portion of the TXOP in the first frequency band is in a first link direction.

9. The method of claim 8, wherein the autonomous data is communicated in the first link direction during the at least a portion of the TXOP, wherein the method further comprises communicating, by the first wireless communication device with a fourth wireless communication device associated with the first network operating entity in the first frequency band, another autonomous data in a second link direction during another portion of the TXOP, and wherein the first link direction and the second link direction are different.

10. The method of claim 8, wherein the autonomous data is communicated in a second link direction in the at least a portion of the TXOP, and wherein the first link direction and the second link direction are different.

11. The method of claim 10, wherein the communicating includes:

monitoring, by the first wireless communication device, in a channel sensing period of the TXOP, the first frequency band for a reservation for autonomous communication in the first link direction; and switching, by the first wireless communication device, dynamically the link priority of the at least a portion of the TXOP from the first link direction to the second link direction based on the monitoring.

12. An apparatus comprising:

a processor configured to:

identify a transmission opportunity (TXOP) in a shared spectrum shared by a plurality of network operating entities, wherein the apparatus is associated with a first network operating entity of the plurality of network operating entities, the TXOP including a plurality of frequency bands in the shared spectrum designated for autonomous communication by different network operating entities of the plurality of network operating entities, wherein the first network operating entity has priority among the plurality of network operating entities for communicating in the TXOP; and identify a first frequency band designated for autonomous communication by the first network operating entity during the TXOP from among the plurality of frequency bands, wherein a second frequency band in the shared spectrum different from the plurality of frequency bands is designated for regular communication by the first network operating entity during the TXOP; and a transceiver configured to:

communicate, with a first wireless communication device associated with the first network operating entity in the first frequency band, autonomous data during the TXOP; and communicate, with a second wireless communication device associated with the first network operating entity in the first frequency band and the second frequency band, regular data in a downlink (DL) direction during the TXOP based on a regular schedule.

13. The apparatus of claim 12, wherein the autonomous data is communicated independent of the regular schedule.

14. The apparatus of claim 12, wherein the transceiver is further configured to:

communicate, with a third wireless communication device associated with the first network operating entity in the second frequency band, another regular data in an uplink (UL) direction during the TXOP based on another regular schedule, wherein the autonomous data is communicated in the UL direction at the same time as the another regular data.

15. The apparatus of claim 12, wherein the transceiver is further configured to communicate, with a third wireless communication device associated with the first network operating entity in a third frequency band of the plurality of frequency bands, another autonomous data in another TXOP, wherein the first network operating entity does not have priority among the plurality of network operating entities in the another TXOP, and wherein the third frequency band in the another TXOP is designated for autonomous communication by the first network operating entity.

16. The apparatus of claim 15, wherein the first frequency band and the third frequency band are different frequency bands.

17. The apparatus of claim 12, wherein the transceiver is further configured to transmit, in a first channel sensing period of another TXOP, a reservation for regular communication in a transmission period of the another TXOP, and wherein the processor is further configured to: detect, in a second channel sensing period of the another TXOP, a reservation for time-critical communication in the transmission period from a second network operating entity of the plurality of network operating entities; and refrain from the regular communication in the transmission period based on the detected reservation.

18. The apparatus of claim 12, wherein the transceiver is further configured to:

transmit, in a channel sensing period of another TXOP, a reservation for time-critical communication in a transmission period of the another TXOP, wherein the first network operating entity does not have priority among the plurality of network operating entities in the another TXOP; and communicate time-critical data in the transmission period.

19. The apparatus of claim 12, wherein a link priority of at least a portion of the TXOP in the first frequency band is in a first link direction.

20. The apparatus of claim 19, wherein the autonomous data is communicated in the first link direction during the at least a portion of the TXOP, wherein the transceiver is further configured to communicate, with a third wireless communication device associated with the first network operating entity in the first frequency band, another autonomous data in a second link direction during another portion of the TXOP, and wherein the first link direction and the second link direction are different.

21. The apparatus of claim 19, wherein the autonomous data is communicated in a second link direction in the at least a portion of the TXOP, and wherein the first link direction and the second link direction are different.

22. The apparatus of claim 21, wherein the transceiver is further configured to communicate with the first wireless communication device by:

monitoring in a channel sensing period of the TXOP, the first frequency band for a reservation for autonomous communication in the first link direction; and switching dynamically the link priority of the at least a portion of the TXOP from the first link direction to the second link direction based on the monitoring.

* * * * *